(12) United States Patent
Diachina et al.

(10) Patent No.: US 12,256,351 B2
(45) Date of Patent: Mar. 18, 2025

(54) SUPPORTING QOS FLOW SPECIFIC UNCERTAINTY ATTRIBUTE

(71) Applicant: Telefonaktiebolaget LM Ericsson (publ), Stockholm (SE)

(72) Inventors: John Walter Diachina, Garner, NC (US); Magnus Sandgren, Staffanstorp (SE); Bikramjit Singh, Raasepori (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 186 days.

(21) Appl. No.: 17/909,878

(22) PCT Filed: Mar. 12, 2021

(86) PCT No.: PCT/IB2021/052096
§ 371 (c)(1),
(2) Date: Sep. 7, 2022

(87) PCT Pub. No.: WO2021/181363
PCT Pub. Date: Sep. 16, 2021

(65) Prior Publication Data
US 2023/0104424 A1 Apr. 6, 2023

Related U.S. Application Data

(60) Provisional application No. 62/992,421, filed on Mar. 20, 2020, provisional application No. 62/989,100, filed on Mar. 13, 2020.

(51) Int. Cl.
*H04W 56/00* (2009.01)
(52) U.S. Cl.
CPC ..... *H04W 56/004* (2013.01); *H04W 56/0015* (2013.01); *H04W 56/0065* (2013.01)

(58) Field of Classification Search
CPC ........... H04W 56/004; H04W 56/0015; H04W 56/0065; H04W 28/0268; H04J 3/12; H04J 3/0667
See application file for complete search history.

(56) References Cited

U.S. PATENT DOCUMENTS

| 2010/0118895 A1 | 5/2010 | Radulescu |
| 2010/0183036 A1 | 7/2010 | Laamanen et al. |

(Continued)

FOREIGN PATENT DOCUMENTS

| CN | 1934809 A | 3/2007 |
| CN | 104918317 A | 9/2015 |

(Continued)

OTHER PUBLICATIONS

Chinese Office Action and English language summary translation of the Chinese Office Action dated Dec. 5, 2023 issued in corresponding Chinese Application No. 202080069347.5, consisting of 16 pages.

(Continued)

*Primary Examiner* — Ashley Shivers
(74) *Attorney, Agent, or Firm* — Weisberg I.P. Law, P.A.

(57) ABSTRACT

A method, network node and core network node are provided. According to one aspect, a network node configured to communicate with a wireless device via an access network is provided. The network node includes processing circuitry configured to receive at least one parameter from a core network node where the at least one parameter indicates a level of synchronization accuracy that is required for a time sensitive network, TSN, clock in a TSN, and implement one of a plurality of methods in the access network for distributing access network clock information to the wireless device and for determining downlink propagation delay information based on the level of synchronization accuracy for the TSN clock where each method is associated with a (Continued)

different level of synchronization accuracy for the access network clock.

26 Claims, 11 Drawing Sheets

(56) References Cited

U.S. PATENT DOCUMENTS

| | | |
|---|---|---|
| 2011/0267956 A1 | 11/2011 | Yonge, III et al. |
| 2017/0303223 A1 | 10/2017 | Thompson et al. |
| 2018/0132199 A1 | 5/2018 | Zhang et al. |
| 2019/0007052 A1 | 1/2019 | Nelson |
| 2019/0058245 A1 | 2/2019 | Safavi Naeini et al. |
| 2020/0053678 A1 | 2/2020 | Moon et al. |
| 2020/0076439 A1 | 3/2020 | Weeks et al. |
| 2020/0112975 A1 | 4/2020 | Moon et al. |
| 2020/0127751 A1 | 4/2020 | Itagaki et al. |
| 2020/0228220 A1 | 7/2020 | Joseph et al. |
| 2020/0229124 A1 | 7/2020 | Soriaga et al. |
| 2020/0267672 A1 | 8/2020 | Chien et al. |
| 2020/0280383 A1 | 9/2020 | Herber et al. |
| 2020/0322908 A1 | 10/2020 | Prakash et al. |
| 2021/0006344 A1 | 1/2021 | Chen et al. |
| 2021/0144666 A1 | 5/2021 | Sivasiva Ganesan et al. |
| 2021/0153148 A1 | 5/2021 | Joseph et al. |
| 2021/0219253 A1 | 7/2021 | Van Phan et al. |
| 2021/0250885 A1 | 8/2021 | Medles et al. |
| 2021/0281298 A1 | 9/2021 | Forenza et al. |
| 2021/0345276 A1 | 11/2021 | Uchino et al. |
| 2022/0014296 A1 | 1/2022 | Wang |
| 2022/0039045 A1* | 2/2022 | Sun .................. H04W 56/0015 |
| 2022/0141784 A1 | 5/2022 | Singh et al. |
| 2022/0141786 A1 | 5/2022 | Ruffini et al. |
| 2022/0338143 A1* | 10/2022 | Fu .................... H04W 74/0833 |
| 2022/0342086 A1 | 10/2022 | Yoshida |
| 2022/0377691 A1* | 11/2022 | Fu ...................... H04W 56/001 |

FOREIGN PATENT DOCUMENTS

| | | |
|---|---|---|
| CN | 106686717 | 5/2017 |
| CN | 109155788 A | 1/2019 |
| CN | 110213007 A | 9/2019 |
| EP | 2209239 A2 | 7/2010 |
| WO | 2018/221238 A1 | 6/2018 |
| WO | 2019/159134 A1 | 8/2019 |
| WO | 2019/173875 A | 9/2019 |
| WO | 2020/031113 A1 | 2/2020 |
| WO | 2020/081062 A1 | 4/2020 |
| WO | 2020081060 A1 | 4/2020 |
| WO | 2020/151806 A1 | 7/2020 |
| WO | 2020/183014 A1 | 9/2020 |
| WO | 2020220747 A1 | 11/2020 |
| WO | 2021/050353 A1 | 3/2021 |
| WO | 2021/066732 A1 | 4/2021 |
| WO | 2021/225511 A1 | 11/2021 |

OTHER PUBLICATIONS

Extended European Search Report dated Sep. 29, 2023 issued in European Application No. 20872599.4, consisting of 12 pages.
Hi Hi 3GPP TSG-RAN WG2 #105; Tdoc R2-1901296; Source: Ericsson; Title: Technical Overview of Clock Synchronization Solutions in SA2; Document for: Discussion; Agenda Item: 11.7. 2.1; Athens, Greece, Feb. 25-Mar. 1, 2019, consisting of 8 pages.
3GPP TSG-SA WG1 Meeting #81; S1-180149; Source: Qualcomm Incorporated; Title: FS_5GLAN Editorial Clean-Up; Agenda Item: 7.5; Fukuoka, Japan, Feb. 5-9, 2018, consisting of 40 pages.
Final Office Action dated Sep. 14, 2023 issued in U.S. Appl. No. 17/765,652, consisting of 19 pages.
Non-Final Office Action issued in U.S. Appl. No. 17/765,652, dated May 9, 2023 consisting of 32 pages.
3GPP TR 23.734 V16.1.0 (Mar. 2019); 3rd Generation Partnership Project; Technical Specification Group Services and System Aspects; Study on Enhancement of 5G System (5GS) for Vertical and Local Area Network (LAN) Services (Release 16), consisting of 111 pages.
3GPP TR 38.825 V16.0.0 (Mar. 2019); 3rd Generation Partnership Project; Technical Specification Group Radio Access Network; Study on NR Industrial Internet of Things (IoT); Release 16), consisting of 33 pages.
3GPP TS 23.501 V16.3.0 (Dec. 2019); Technical Specification Group Services and System Aspects; System Architecture for the 5G System (5GS); Stage 2 (Release 16), consisting of 417 pages.
3GPP TS 38.133 V15.0.0 (Dec. 2017); 3rd Generation Partnership Project; Technical Specification Group Radio Access Network; NR; Requirements for Support of Radio Resource Management (Release 15), consisting of 41 pages.
3GPP TS 38.133 V16.0.0 (Jun. 2019); 3rd Generation Partnership Project; Technical Specification Group Radio Access Network; NR; Requirements for Support of Radio Resource Management (Release 16), consisting of 999 pages.
3GPP TSG-RAN WG2 Meeting #103bis; R2-1815270; Title: Enhancement for Time-Sensitive Networking; Source: CMCC; Agenda Item: 11.7.2; Document for: Discussion; Chengdu, China Oct. 8-12, 2018, consisting of 10 pages.
3GPP TSG RAN WG1 Ad-Hoc Meeting 1901; Tdoc R1-1900181; Title: Analysis of time Synchronization Accuracy over Uu Interface; Source: Ericsson; Agenda Item: 7.2.6.4; Document for: Discussion, Decision; Taipei, Taiwan, Jan. 21-25, 2019, consisting of 5 pages.
3GPP TSG-RAN Meeting #98; Tdoc R1-1908127; Title: Other Enhancements to Uplink and Downlink Transmissions for NR URLLC—Response to Incoming LS; Source: Ericsson; Agenda Item: 7.2.6.7; Document for: Discussion, Decision; Prague, CZ, Aug. 26-30, 2019, consisting of 10 pages.
3GPP TSG-RAN WG2 #107bis; Tdoc R2-1912549; Title: On Downlink Delay Compensation; Source: Ericsson; Agenda Item: 6.7.2.1; Document for: Discussion, Decision; Chongqing, China, Oct. 14-18, 2019, consisting of 3 pages.
3GPP TSG-RAN WG2 Meeting #107bis; R2-1913470; Title: Propagation Delay Compensation for Accurate Reference Timing; Source: Huawei, HiSilicon; Agenda Item: 6.7.2.1; Document for: Discussion and Decision; Chongqing, China, Oct. 14-18, 2019, consisting of 3 pages.
3GPP TSG-RAN2 Meeting #107bis; R2-1913267; Resubmission of R2-1910073 Title: Propagation Delay Compensation by the gNB; Source: MediaTek Inc.; Agenda Item: 6.7.2.1; Document for: Discussion and Decision; Chongqing, China, Oct. 14-18, 2019, consisting of 3 pages.
3GPP TSG-RAN WG2 Meeting #109-e; R2-2001047; Title: Propagation Delay Compensation; Source: Nokia, Nokia Shanghai Bell; Agenda Item: 6.7.2.1; Document for: Discussion and Decision; Online, Feb. 24-Mar. 6, 2020, consisting of 5 pages.
International Search Report and Written Opinion dated Feb. 16, 2021 issued in PCT Application No. PCT/SE2020/050938, consisting of 11 pages.
Taiwan Office Action and English Summary of the Taiwan Office Action dated Apr. 28, 2021 issued in Application No. 109134496, consisting of 6 pages.
Indian Examination Report dated Aug. 4, 2022 issued in Application No. 202217019076, consisting of 6 pages.
International Search Report and Written Opinion dated Jun. 14, 2021 issued in PCT Application No. PCT/IB2021/052096, consisting of 16 pages.
Written Opinion of the International Preliminary Examining Authority dated Mar. 3, 2022 issued in PCT Application No. PCT/IB2021/052096, consisting of 8 pages.
Notification of Transmittal of the International Preliminary Report on Patentability dated Jul. 7, 2022 issued in PCT Application No. PCT/IB2021/052096, consisting of 33 pages.
3GPP TR 23.734 Draft V16.0.0 3rd Generation Partnership Project; Technical Specification Group Services and System Aspects; Study on Enhancement of 5GS for Vertical and LAN Services (Release 16), Feb. 2019, consisting of 110 pages.

(56) References Cited

OTHER PUBLICATIONS

Chinese Office Action dated Dec. 19, 2024 and English translation of the text of the Chinese Office Action issued in corresponding Chinese Application No. 2021800204257, consisting of 14 pages.

\* cited by examiner

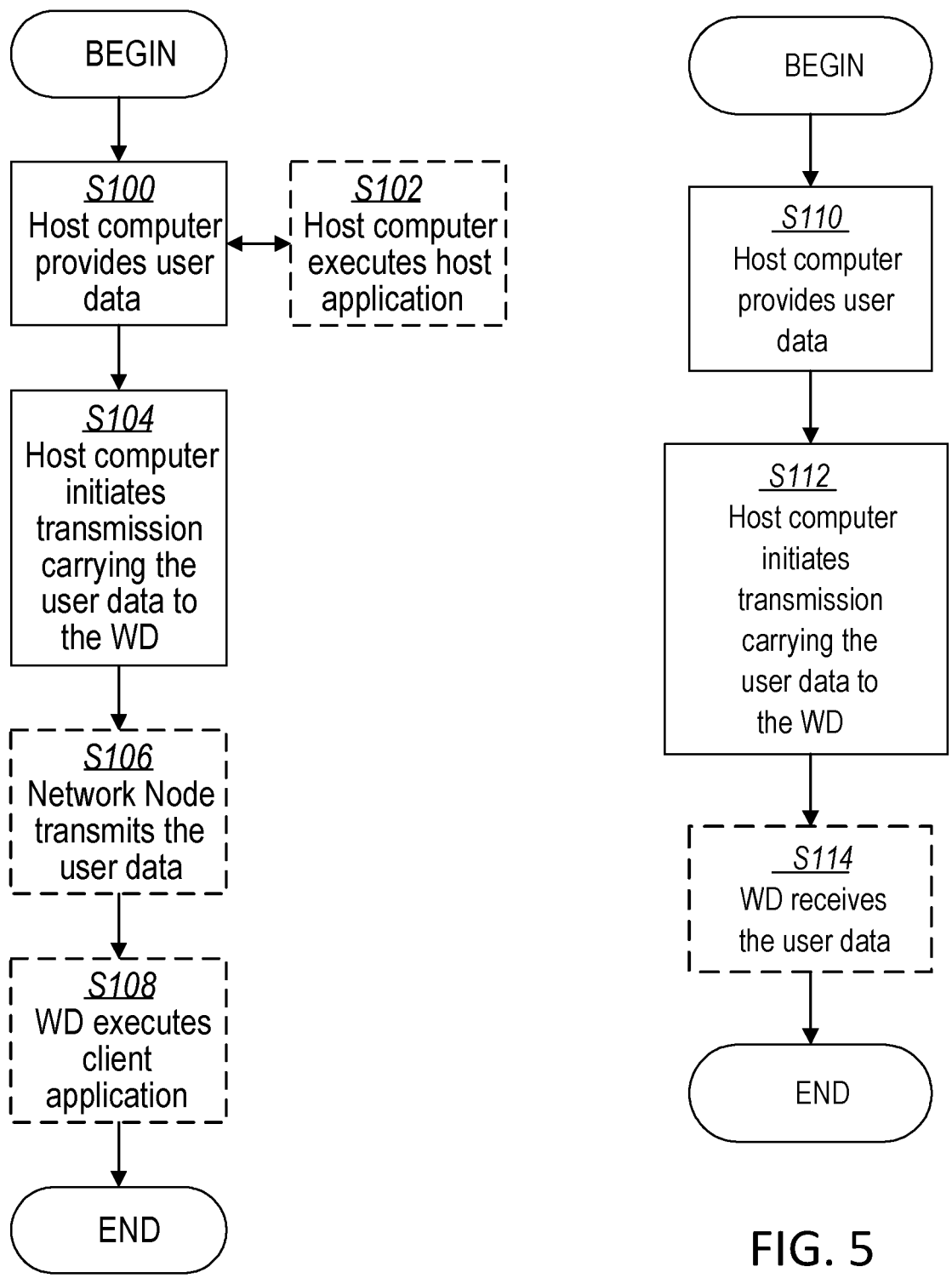

SUPPORTING QOS FLOW SPECIFIC UNCERTAINTY ATTRIBUTE

This application is a Submission Under 35 U.S.C. § 371 for U.S. National Stage Patent Application of International Application No.: PCT/IB2021/052096, filed Mar. 12, 2021 entitled "SUPPORTING QOS FLOW SPECIFIC UNCERTAINTY ATTRIBUTE," which claims priority to U.S. Provisional Application No. 62/989,100, filed Mar. 13, 2020, entitled "SUPPORTING QOS FLOW SPECIFIC UNCERTAINTY ATTRIBUTE," and U.S. Provisional Application No. 62/992,421, filed Mar. 20, 2020, entitled "SUPPORTING QOS FLOW SPECIFIC UNCERTAINTY ATTRIBUTE" the entireties of all of which are incorporated herein by reference.

FIELD

The present disclosure relates to wireless communications, and in particular, to support of a quality of service (QoS) flow-specific uncertainty attribute.

BACKGROUND

The Third Generation Partnership Project (3GPP) is developing the Fifth Generation (5G) wireless network communications standard, also referred to as New Radio (NR), to support time sensitive networking (TSN). TSN is expected to be integrated into Ethernet-based industrial communication networks. Applications may include factory automation networking.

This disclosure relates to the problem of inaccuracy and/or uncertainty inherent to methods for relaying the 5G system clock (i.e., an access network clock that serves as a reference time) from a source node in the 5G system to wireless devices (WDs) supporting IoT end devices. The inaccuracy of concern is the error introduced as a result of attempting to identify the radio frequency (RF) propagation delay that occurs when a 5G base station (gNodeB or gNB) transmits a 5G system clock over the radio interface within a message. The message may be, for example, within a system information block (SIB) or radio resource control (RRC) unicast message. The value of the 5G system clock should be compensated to ensure that the clock value received by the WD is as close as possible to the value of that clock in the corresponding gNB or other network node with knowledge of the 5G system clock. In other words, the better the accuracy of relaying the 5G system clock from its source node to the WD the better the accuracy that will be realized when external TSN Grandmaster (GM) clocks are relayed from a TSN grandmaster node through the 5G system to WDs (and subsequently to end-stations):

Ingress timestamping is performed when an external TSN GM clock is received by a 5G system and egress timestamping is performed when that TSN GM clock (relayed through the 5G system) arrives at the WD. See FIG. 1. Note, that since the TSN GM clock can have an arbitrary placement, the ingress time stamping can be performed at various places within the 5GS system e.g., at the user plane function TSN translator (UPF-TT) or at the DS-TT.

The difference between the two timestamps is a reflection of the 5G residence time experienced when relaying the TSN GM clock through the 5G system and it is therefore used to adjust the value of the external TSN GM clock upon its reception at the point of egress.

The timestamping is based on the 5G system clock and the accuracy of delivering this clock to a WD is improved by allowing the propagation delay experienced when sending this clock from a network node to a WD to be more precisely determined.

An additional source of inaccuracy occurs as a result of subsequent WD distribution of the clock to Internet of things (IoT) end devices. This distribution is used to enable TSN functionalities, e.g., Time-Aware Scheduling, of IoT device operations specific to the working domain (a specific factory area) associated with a given working clock.

Identification of WDs Requiring 5G System Clock

At present, a network node such as a gNB is expected to use implementation specific methods to determine which WDs need to receive 5G system clock information. Standardization of such methods does not yet exist. The network node must then decide (a) which method to use to provide 5G system clock information to WDs that require the system clock (i.e., SIB or RRC unicast) and (b) which method (if any) to use for allowing a WD to determine the downlink propagation delay (PD) compensation to apply to the 5G system clock received from the network node.

Methods Available for Determining Downlink PD Compensation

3GPP Timing Advance Command

3GPP Timing Advance (TA) command is a legacy method utilized in cellular communication for uplink transmission synchronization for the following situations.

a) In the beginning, at connection setup, an absolute timing parameter is communicated to a WD using medium access control (MAC) radio access response (RAR) element; and b) After connection setup, a relative timing correction can be sent to a WD using a MAC control element (CE) (e.g., WDs can move due to RF channel changes caused by the environment).

The downlink Propagation Delay (PD) can be estimated for a given WD by (a) first summing the TA value indicated by the RAR (random access response) and all subsequent TA values sent using the MAC CE control element and (b) taking some portion of the total TA value resulting from summation of all the TA values (e.g., 50% could be used when assuming the downlink and uplink propagation delays are essentially the same). The estimated PD can then be utilized to understand time synchronization dynamics, e.g., for accurately tracking the value of a clock at the WD relative to the value of that clock in some other network node.

Pre-Compensation

Besides the 3GPP TA method, methods based on pre-compensation can be devised to reduce the delay introduced by round trip time (RTT) where a compensation factor is deduced utilizing a certain criterion instead of RTT (e.g., TA) based delay. The compensation factor may be known instead of being determined on the fly like in RTT methods. Multiple WDs can be sent the same pre-compensation value.

Current procedures for sending a 5G system clock from a network node to a WD include:

c) SIB broadcasting wherein a specific SIB message includes a value for the 5G system clock having a value that is relative to a specific point in the super frame number (SFN) structure (e.g., the end of the last SFN used for sending system information).

d) RRC unicast wherein a dedicated RRC message is used to send a specific WD a value for the 5G system clock having a value that is relative to a specific point in the SFN structure (e.g., end of SFNx).

Since the definitions of the 5G system clock above relates to when the SFN reference point occurs at the network node antenna, individual compensation for RF air propagation delay (PD) between the network node and the WD will be needed for cells where the downlink propagation delay (PD) is significant considering the downlink propagation delay's potential impact on the synchronization (uncertainty) budget allowed for TSN GM clocks (i.e., for cases where it is important for the WD to accurately derive a value for the downlink PD and use it to correct the 5G system clock time at the WD).

There are different methods that can be used to estimate and compensate the 5G system clock according to the downlink delay propagation. In practice, one method might be best during certain conditions and towards a specific WD while another one might be best for another WD even if both WDs are served by the same network node (gNB). However, how to best select the most appropriate method both for fulfilling TSN GM clock end to end timing accuracy and minimize signaling overhead among a multitude of possibilities based on a multitude of input parameters has not been defined by the 3GPP.

In order for the network and gNB to select between different methods to distribute 5GS timing (5G system clock) to WDs while doing so in a resource-efficient manner, the network node, e.g., gNB, may obtain or derive the following information:

1) Which specific WDs are involved in TSN GM clock distribution:
   Since TSN GM clocks are delivered as user plane information through a 5G system, it may be assumed that a TSN network node (e.g., CNC) supports a method for determining which end stations (ethernet medium access control (MAC) addresses) require the use of any given TSN GM clock;
   Upon receiving an end station specific ethernet packet data unit (PDU) containing TSN GM clock information, the UPF may be expected to use a MAC address to WD mapping function to identify the corresponding WD and deliver it to that WD as user plane information;
   As such, the issues of determining which end stations require the use of any given TSN GM clock and MAC address to WD mapping when performing TSN GM clock distribution are not addressed by this disclosure;
2) What level of accuracy is required for distribution of any given TSN GM clock:
   This is seen as being determined based on the applications that make use of a given TSN GM clock where the accuracy requirement may be the same regardless of the WD to which the TSN GM clock is delivered;
   However, for reasons of flexibility, the level of accuracy required by a WD for any given TSN GM clock can be left as WD specific and therefore the appropriate method for sending 5G system clock information to a WD can be determined based on the accuracy requirements of the TSN GM clocks it supports.
3) Whether a WD performs ingress time stamping for the case where the TSN GM clock is distributed in the uplink (TSN GM clock resides in an end station behind the WD) or performs egress time stamping for the case where the TSN GM clock is distributed in the downlink (TSN GM clock delivered to an end station behind WD):
   Regardless of whether a WD performs ingress or egress timestamping, the WD will need to receive 5G system clock information. If the WD receives TSN GM clock information over a downlink 5G quality of service (QoS) flow, the WD performs egress timestamping whereas if the WD receives TSN GM clock information from an end station (for transmission over an uplink 5G QoS flow), the WD performs ingress timestamping;
   As such, WD knowledge of how it has received TSN GM clock information (i.e. downlink 5G QoS flow or from an end station) can be used by the WD to determine what type of time stamp to apply.

SUMMARY

Some embodiments advantageously provide methods, network nodes and core network nodes for support of a quality of service (QoS) flow specific uncertainty attribute. Different methods that can be used by a 5G network node to determine whether to transmit the 5G system clock to a wireless device (WD) are disclosed. Core network (CN)-based configuration information may be expected to (a) identify which WDs need which TSN GM clocks and (b) identify which of one or more 5G QoS flows are dedicated to supporting the transmission of this information. This knowledge could be made available to a network node such that once the network node knows that a WD requires a TSN GM Clock, the network node also knows implicitly that the WD needs to be sent the 5G system clock (for performing timestamping used for measuring 5G residence time experienced by TSN GM clocks). A network node being provided with this knowledge therefore avoids any need for a WD to explicitly send a notification to the network node indicating it needs to receive the 5G system clock.

It is also expected that, for 3GPP 5G standards release 17 (3GPP Rel-17), there will be a demand to provide a new round trip time (RTT) procedure for improving the accuracy with which downlink propagation delay (PD) is determined for a given WD. This means a network node will need to know whether it should use either the legacy RTT procedure (i.e., the legacy TA procedure) or the new RTT procedure to provide the WD with downlink PD compensation information. Regardless of which of the legacy or new RTT procedure are used, the network node will implicitly know that the corresponding WD needs to receive the 5G system clock.

Some considerations provide that at least one dedicated 5G QoS flow is to be used for sending TSN GM Clock information (i.e., General Precision Time Protocol (gPTP) signaling) to a WD. Providing a network node knowledge of the existence of such a 5G QoS flow can therefore serve to implicitly indicate that any WD receiving user plane information using this 5G QoS flow may inherently need 5G reference time information.

Some embodiments may include methods to:
Allow a network node, e.g., gNB, to determine the level of accuracy required by a WD for supporting any given TSN GM clock and thereby determine the appropriate method for sending 5G system clock information to that WD;
Allow a WD to determine whether it is to perform ingress or egress time stamping based on whether it receives TSN GM clock information from an end station (in which case ingress time stamping is performed) or over a downlink 5G QoS flow (in which case egress timestamping is performed).

According to one aspect of the disclosure, a network node configured to communicate with a wireless device via an access network is provided. The network node includes processing circuitry configured to receive at least one parameter from a core network node where the at least one parameter indicates a level of synchronization accuracy that is required for a time sensitive network, TSN, clock in a TSN, and implement one of a plurality of methods in the access network for distributing access network clock information to the wireless device and for determining downlink propagation delay information based on the level of synchronization accuracy for the TSN clock where each one of the plurality of methods is associated with a different level of synchronization accuracy for the access network clock.

According to one or more embodiments of this aspect, the downlink propagation delay information is configured to allow for updating of an access network clock associated with the access network clock information where the updated access network clock is configured to allow for timestamping of TSN clock information for compensation of the TSN clock information. According to one or more embodiments of this aspect, the at least one parameter is time sensitive communication assistance information, TSCAI, the TSCAI having a grandmaster, GM, clock synchronization accuracy parameter. According to one or more embodiments of this aspect, the TSN clock information is relayed through the access network using at least one QoS flow for communication to an end station in the TSN via the wireless device.

According to one or more embodiments of this aspect, the at least one QoS flow includes a first QoS flow and a second QoS flow where the TSN clock information is relayed through the access network using the first QoS flow that is associated with a first protocol data unit, PDU, session from the wireless device and the second QoS flow associated with a second PDU session from another wireless device that is connected to an end station that requires the TSN clock. According to one or more embodiments of this aspect, the at least one QoS flow is configured to indicate a plurality of levels of accuracy for the TSN clock. According to one or more embodiments of this aspect, the TSN clock information is distributed in a user plane of the access network.

According to one or more embodiments of this aspect, the level of synchronization accuracy for the access network clock corresponds to an amount of end-to-end synchronization accuracy required for the TSN clock. According to one or more embodiments of this aspect, the plurality of methods includes at least one of: a first method that includes determining propagation delay in the access network using a legacy TA process, a second method that includes determining propagation delay in the access network using a round trip time, RTT, process where the RTT process has a higher synchronization accuracy than the legacy TA process, and a third method that does not include determining propagation delay in the access network. The determined propagation delay is configured to be used for access network clock compensation. According to one or more embodiments of this aspect, the plurality of methods includes at least one of a first method configured to broadcast access network clock information to the wireless device using system information block, SIB, broadcast, and a second method configured to use radio resource control, RRC, unicast to distribute access network clock information to the wireless device.

According to another aspect of the disclosure, a wireless device configured to communicate with a network node via an access network and with an end station in a time sensitive network, TSN, is provided. The wireless device includes processing circuitry configured to receive access network clock information and downlink propagation delay information via one of a plurality of methods that meets a level of synchronization accuracy for the access network that is required by the wireless device for a TSN clock in the TSN where each one of the plurality of methods is associated with a different level of synchronization accuracy for the access network clock, and cause transmission of the TSN clock information to the end station in the TSN.

According to one or more embodiments of this aspect, the processing circuitry is configured to determine a propagation delay based at least on the downlink propagation delay, update the access network clock based on the determined propagation delay, perform egress timestamping on the TSN clock information that is received from the network node where the egress timestamping is performed using the updated access network clock, determine an adjustment is required for the TSN clock information based at least on the egress timestamping, and compensate the TSN clock information based on the determined adjustment. According to one or more embodiments of this aspect, the processing circuitry is configured to determine a propagation delay based at least on the downlink propagation delay, update the access network clock based on the determined propagation delay, and perform ingress timestamping on the TSN clock information that is received from an end station in the TSN where the ingress timestamping is performed using the updated access network clock, and where the ingress timestamping is configured to be used for adjusting the TSN clock information. According to one or more embodiments of this aspect, the TSN clock information is relayed through the access network using the at least one QoS flow.

According to one or more embodiments of this aspect, the at least one QoS flow includes a first QoS flow and a second QoS flow, and where the TSN clock information is relayed through the access network using the first QoS flow that is associated with a first protocol data unit, PDU, session from the wireless device and the second QoS flow associated with a second PDU session from another wireless device that is connected to an end station that requires the TSN clock. According to one or more embodiments of this aspect, the at least one QoS flow is configured to indicate a plurality of levels of accuracy for a TSN clock. According to one or more embodiments of this aspect, the TSN clock information is received in a user plane of the access network.

According to one or more embodiments of this aspect, the level of synchronization accuracy for the access network clock corresponds to an amount of end-to-end synchronization accuracy required for the TSN clock. According to one or more embodiments of this aspect, the plurality of methods includes at least one of a first method that includes determining propagation delay in the access network using a legacy TA process, a second method that includes determining propagation delay in the access network using a round trip time, RTT, process where the RTT process has a higher synchronization accuracy than the legacy TA process, and a third method that does not include determining propagation delay in the access network. The determined propagation delay is configured to be used for access network clock compensation. According to one or more embodiments of this aspect, the plurality of methods includes at least one of a first method configured to broadcast access network clock information to the wireless device using system information block, SIB, broadcast, and a second method configured to use radio resource control, RRC, unicast to distribute access network clock information to the wireless device.

According to another aspect of the disclosure, a method implemented by a network node that is configured to communicate with a wireless device via an access network is provided. At least one parameter from a core network node is received where the at least one parameter indicates a level of synchronization accuracy that is required for a time sensitive network, TSN, clock in a TSN. One of a plurality of methods in the access network for distributing access network clock information to the wireless device and for determining downlink propagation delay information is implemented based on the level of synchronization accuracy for the TSN clock where each one of the plurality of methods is associated with a different level of synchronization accuracy for the access network clock.

According to one or more embodiments of this aspect, the downlink propagation delay information is configured to allow for updating of an access network clock associated with the access network clock information where the updated access network clock is configured to allow for timestamping of TSN clock information for compensation of the TSN clock information. According to one or more embodiments of this aspect, the at least one parameter is time sensitive communication assistance information, TSCAI, the TSCAI having a grandmaster, GM, clock synchronization accuracy parameter. According to one or more embodiments of this aspect, the TSN clock information is relayed through the access network using at least one QoS flow for communication to an end station in the TSN via the wireless device.

According to one or more embodiments of this aspect, the at least one QoS flow includes a first QoS flow and a second QoS flow. The TSN clock information is relayed through the access network using the first QoS flow that is associated with a first protocol data unit, PDU, session from the wireless device and the second QoS flow associated with a second PDU session from another wireless device that is connected to an end station that requires the TSN clock. According to one or more embodiments of this aspect, the at least one QoS flow is configured to indicate a plurality of levels of accuracy for the TSN clock. According to one or more embodiments of this aspect, the TSN clock information is distributed in a user plane of the access network.

According to one or more embodiments of this aspect, the level of synchronization accuracy for the access network clock corresponds to an amount of end-to-end synchronization accuracy required for the TSN clock. According to one or more embodiments of this aspect, the plurality of methods includes at least one of a first method that includes determining propagation delay in the access network using a legacy TA process, a second method that includes determining propagation delay in the access network using a round trip time, RTT, process where the RTT process has a higher synchronization accuracy than the legacy TA process, and a third method that does not include determining propagation delay in the access network. The determined propagation delay is configured to be used for access network clock compensation. According to one or more embodiments of this aspect, the plurality of methods includes at least one of a first method configured to broadcast access network clock information to the wireless device using system information block, SIB, broadcast, and a second method configured to use radio resource control, RRC, unicast to distribute access network clock information to the wireless device.

According to another aspect of the disclosure, a method implemented by a wireless device that is configured to communicate with a network node via an access network and with an end station in a time sensitive network, TSN, is provided. Access network clock information and downlink propagation delay information is received via one of a plurality of methods that meets a level of synchronization accuracy for the access network that is required by the wireless device for a TSN clock in the TSN where each one of the plurality of methods is associated with a different level of synchronization accuracy for the access network clock. Transmission is caused of the TSN clock information to the end station in the TSN.

According to one or more embodiments of this aspect, a propagation delay is determined based at least on the downlink propagation delay. The access network clock is updated based on the determined propagation delay. Egress timestamping is performed on the TSN clock information that is received from the network node where the egress timestamping is performed using the updated access network clock. A determination is made that an adjustment is required for the TSN clock information based at least on the egress timestamping. The TSN clock information is compensated based on the determined adjustment. According to one or more embodiments of this aspect, a propagation delay is determined based at least on the downlink propagation delay. The access network clock is updated based on the determined propagation delay. Ingress timestamping is performed on the TSN clock information that is received from an end station in the TSN where the ingress timestamping is performed using the updated access network clock, and where the ingress timestamping is configured to be used for determining for adjusting the TSN clock information.

According to one or more embodiments of this aspect, the TSN clock information is relayed through the access network using the at least one QoS flow. According to one or more embodiments of this aspect, the at least one QoS flow includes a first QoS flow and a second QoS flow. The TSN clock information is relayed through the access network using the first QoS flow that is associated with a first protocol data unit, PDU, session from the wireless device and the second QoS flow associated with a second PDU session from another wireless device that is connected to an end station that requires the TSN clock. According to one or more embodiments of this aspect, the at least one QoS flow is configured to indicate a plurality of levels of accuracy for a TSN clock.

According to one or more embodiments of this aspect, the TSN clock information is received in a user plane of the access network. According to one or more embodiments of this aspect, the level of synchronization accuracy for the access network clock corresponds to an amount of end-to-end synchronization accuracy required for the TSN clock. According to one or more embodiments of this aspect, the plurality of methods includes at least one of a first method that includes determining propagation delay in the access network using a legacy TA process, a second method that includes determining propagation delay in the access network using a round trip time, RTT, process where the RTT process has a higher synchronization accuracy than the legacy TA process, and a third method that does not include determining propagation delay in the access network The determined propagation delay is configured to be used for access network clock compensation. According to one or more embodiments of this aspect, the plurality of methods includes at least one of a first method configured to broadcast access network clock information to the wireless device using system information block, SIB, broadcast, and a second method configured to use radio resource control, RRC, unicast to distribute access network clock information to the wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating example methods implemented in a communication system including a host computer, a network node and a wireless device for executing a client application at a wireless device according to some embodiments of the present disclosure;

FIG. 5 is a flowchart illustrating example methods implemented in a communication system including a host computer, a network node and a wireless device for receiving user data at a wireless device according to some embodiments of the present disclosure;

DETAILED DESCRIPTION

Figure 1:
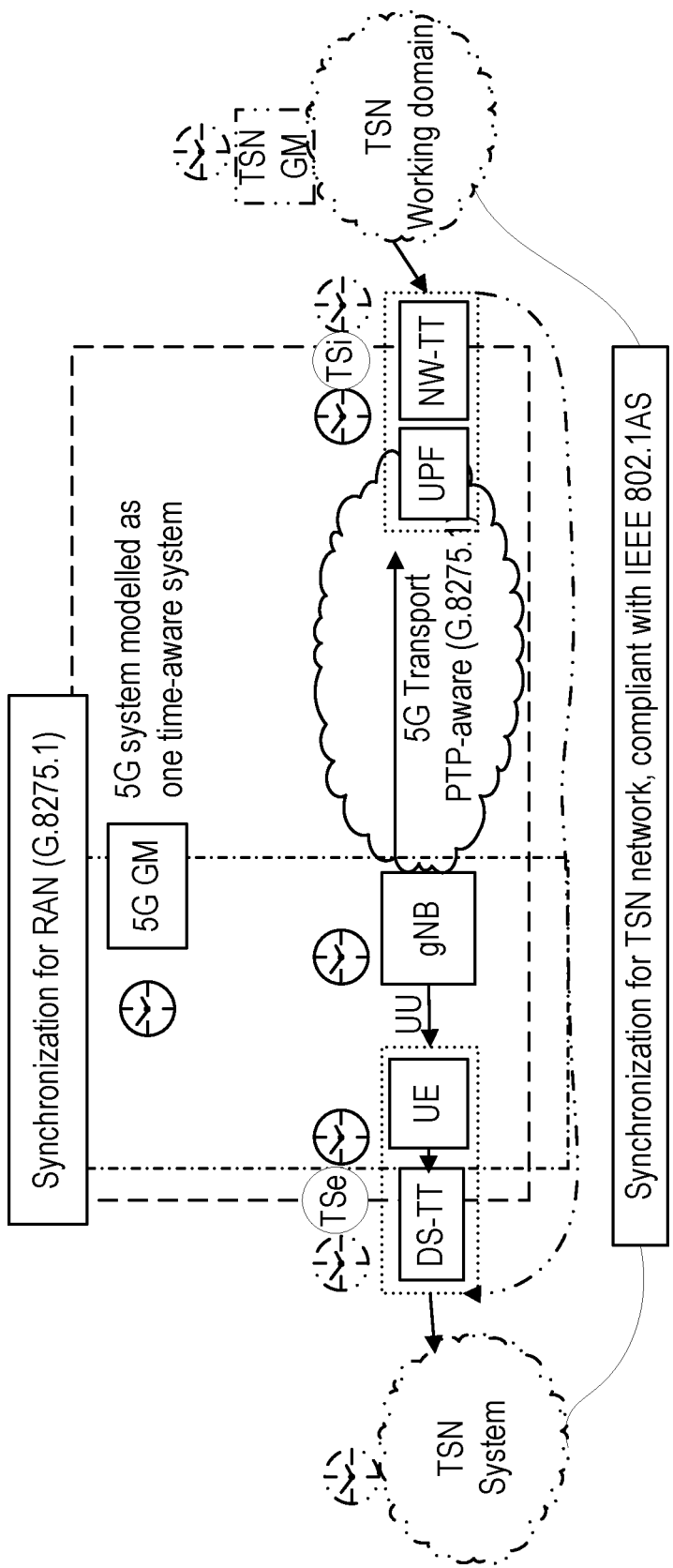
FIG. 1 is a block diagram that illustrates ingress and egress timestamping for a TSN GM clock.

Before describing in detail exemplary embodiments, it is noted that the embodiments reside primarily in combinations of apparatus components and processing steps related to support of a quality of service (QoS) flow specific uncertainty attribute. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Methods for enabling a network node to determine when and/or how a WD should receive the 5G system clock (e.g. access network clock) and/or TSN GM clock information are disclosed herein. Advantages over other arrangements may include one or more of the following:
  WDs may not need to trigger radio interface signaling to provide network nodes with an indication of their need for 5G system clock information (i.e., radio interface signaling capacity is saved by avoiding unnecessary control plane signaling);
  CN based configuration information is already expected to (a) identify which WDs need which TSN GM clocks and (b) identify which 5G QoS flow(s) are dedicated to supporting the transmission of this information. The configuration of dedicated 5G QoS flows for supporting TSN GM clock information can be enhanced to allow a network node to determine the level of accuracy to be associated with any given TSN GM clock and thereby determine the appropriate method for sending 5G system clock information to any WD using that TSN GM clock;
  The intra-5G system signaling already required for 5G QoS flow configuration can therefore be used to also serve as a means to implicitly inform a network node about when a WD needs 5G system clock information; and/or
  A WD can autonomously determine whether to perform ingress or egress time stamping based on whether it receives TSN GM clock information from an end station (in which case ingress time stamping is performed) or over a downlink 5G QoS flow (in which case egress timestamping is performed, in some embodiments).

Figure 2:
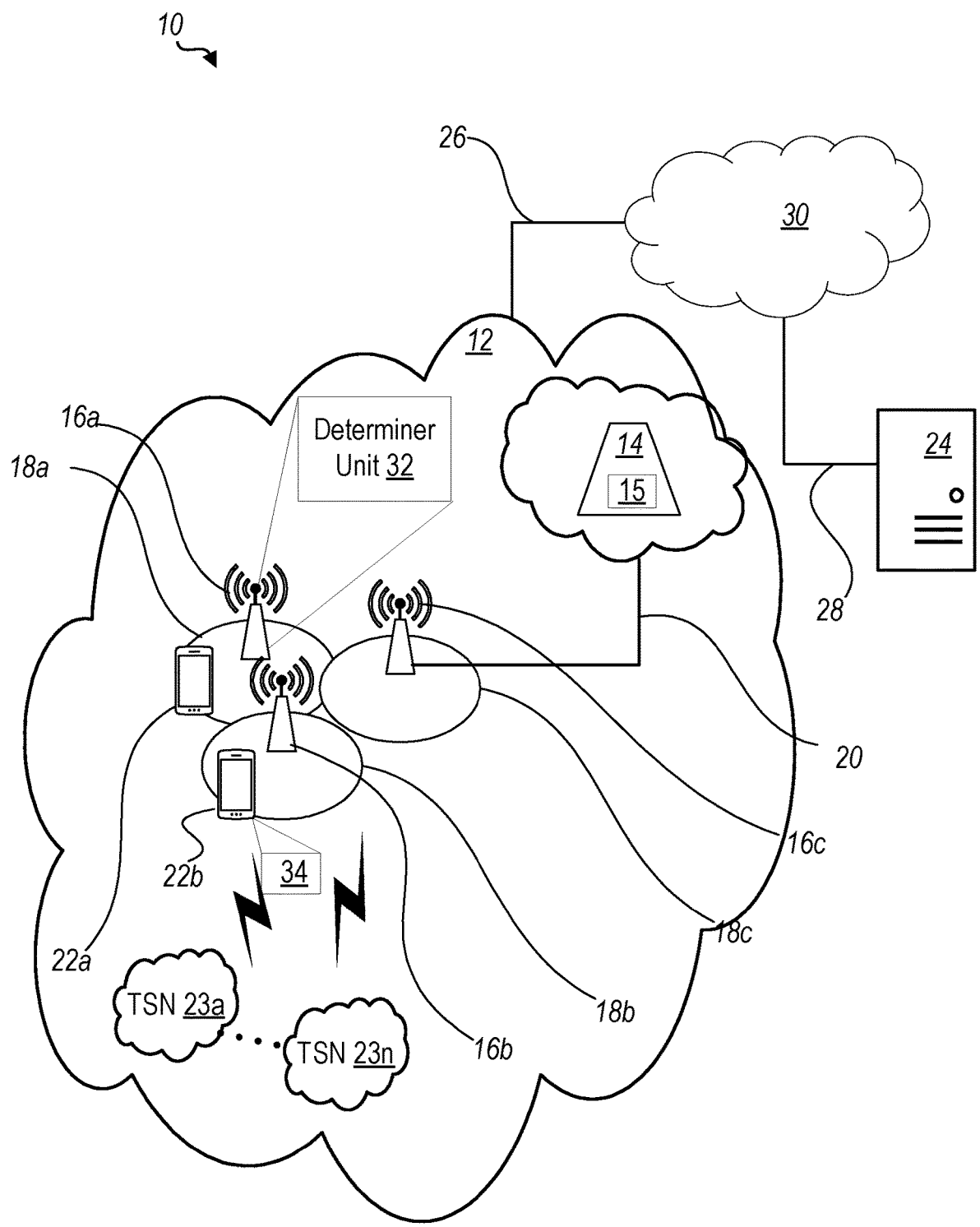
FIG. 2 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network node 14. The core network node 12 may be in core network within the access network 12 in some embodiments. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network node 12 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a network node for NR/NG-RAN. Further, one or more WDs 22 may be configured to communicate with one or more time sensitive networks 23a-23n (collectively referred to as time sensitive network 23 or TSN 23). Each TSN 23 may include or service one or more end stations (not shown) where communication between TSNs 23 may be performed via access network 12 as described herein. While TSN 23 is illustrated as being within the access network 12, TSN 23 is a logically separate network from the access network 12.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network node 12 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network node 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

In some embodiments, the core network node 12 may include a (Time Sensitive Communications Assistance Information (TSCAI) generator 15 configured to generate TSCAI having a GM clock synchronization accuracy parameter. In some embodiments, the network node 16 is configured to include a determiner unit 32 which is configured to determine a method for sending 5G system clock information to the WD, the determining being based at least in part on the determined level of accuracy required by a WD for a given TSN GM clock. In some embodiments, the WD 22 is configured to include a time stamp determiner 34 which is configured to determine whether to perform ingress or egress time stamping based on whether the WD receives time sensitive network, TSN, grandmaster, GM, clock information from an end station, in which case, ingress time stamping is performed, or over a downlink 5G quality of service, QoS, flow, in which case, egress time stamping is performed.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network node 12 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a determiner unit 32 which is configured to determine a method for sending 5G system clock information to the WD, the determining being based at least in part on the determined level of accuracy required for a given TSN GM clock.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. In some embodiments, the processing circuitry 84 is further configured to implement the time stamp determiner 34 configured to determine whether to perform ingress or egress time stamping based on whether the WD receives time sensitive network, TSN, grandmaster, GM, clock information from an end station, in which case, ingress time stamping is performed, or over a downlink 5G quality of service, QoS, flow, in which case, egress time stamping is performed.

Figure 3:
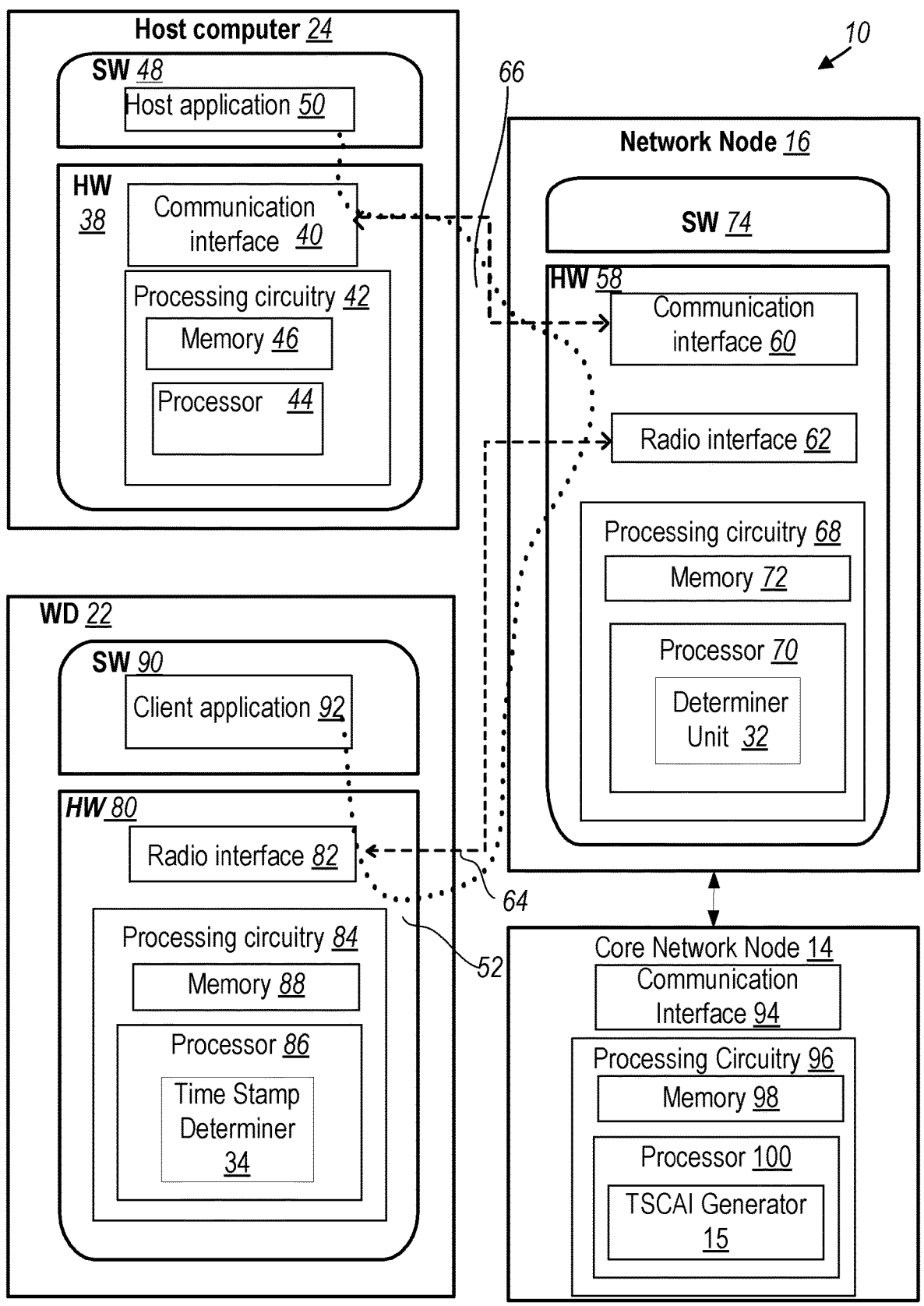
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

FIG. 3 also shows a core network node 12 having a communication interface 94 configured to communicate with one or more network nodes 16 via wireline and/or wireless communications. The core network node 14 also include processing circuitry 96 which may include memory 98 and processor 100. The processor 100 is configured to include the TSCAI generator 15 configured to generate TSCAI having a GM clock synchronization accuracy parameter.

Although FIGS. 2 and 3 show various "units" such as the TSCAI generator 15, determiner unit 32 and time stamp determiner 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 6, 7:
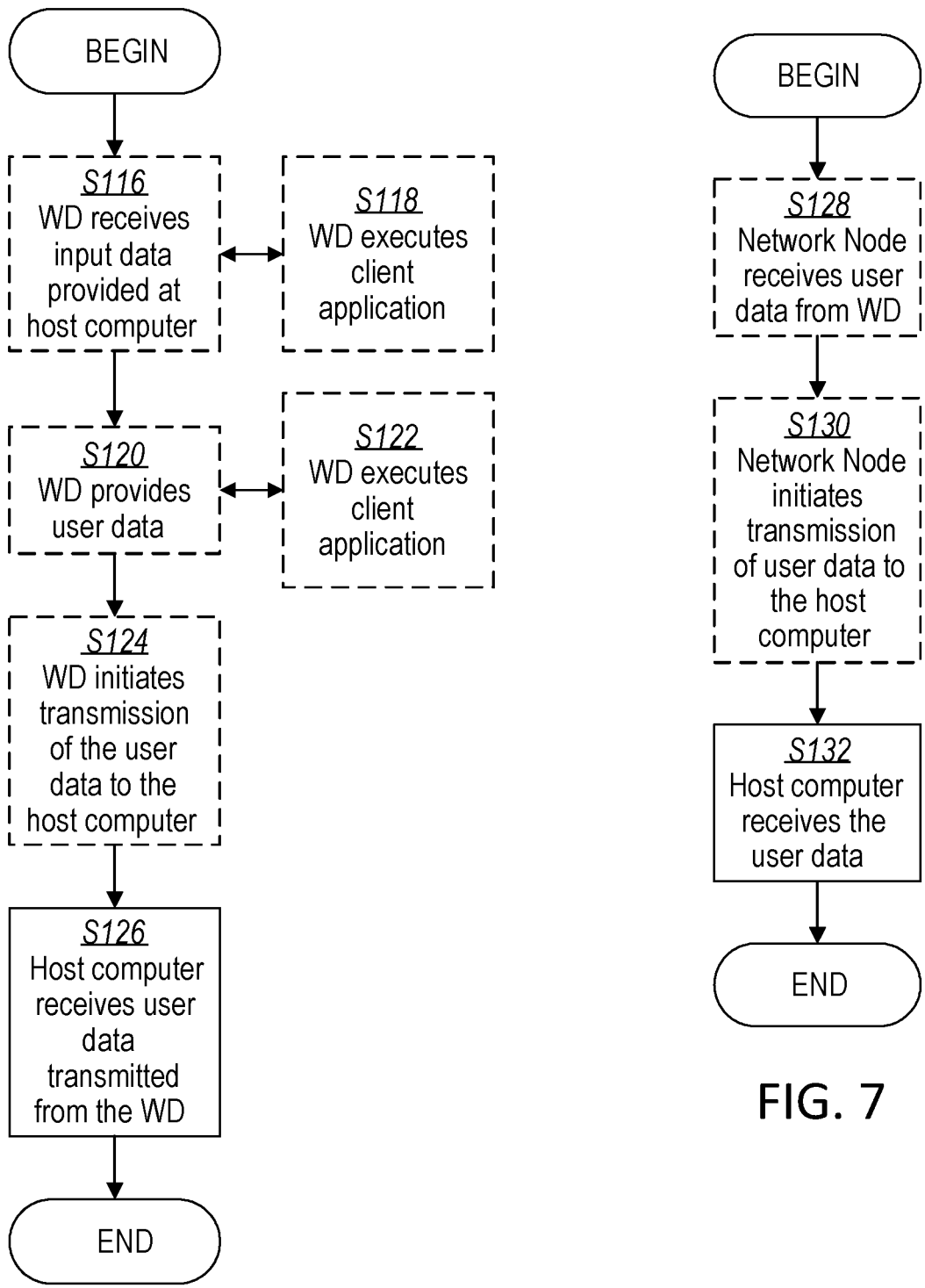
FIG. 6 is a flowchart illustrating example methods implemented in a communication system including a host computer, a network node and a wireless device for receiving user data from the wireless device at a host computer according to some embodiments of the present disclosure.
FIG. 7 is a flowchart illustrating example methods implemented in a communication system including a host computer, a network node and a wireless device for receiving user data at a host computer according to some embodiments of the present disclosure.

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
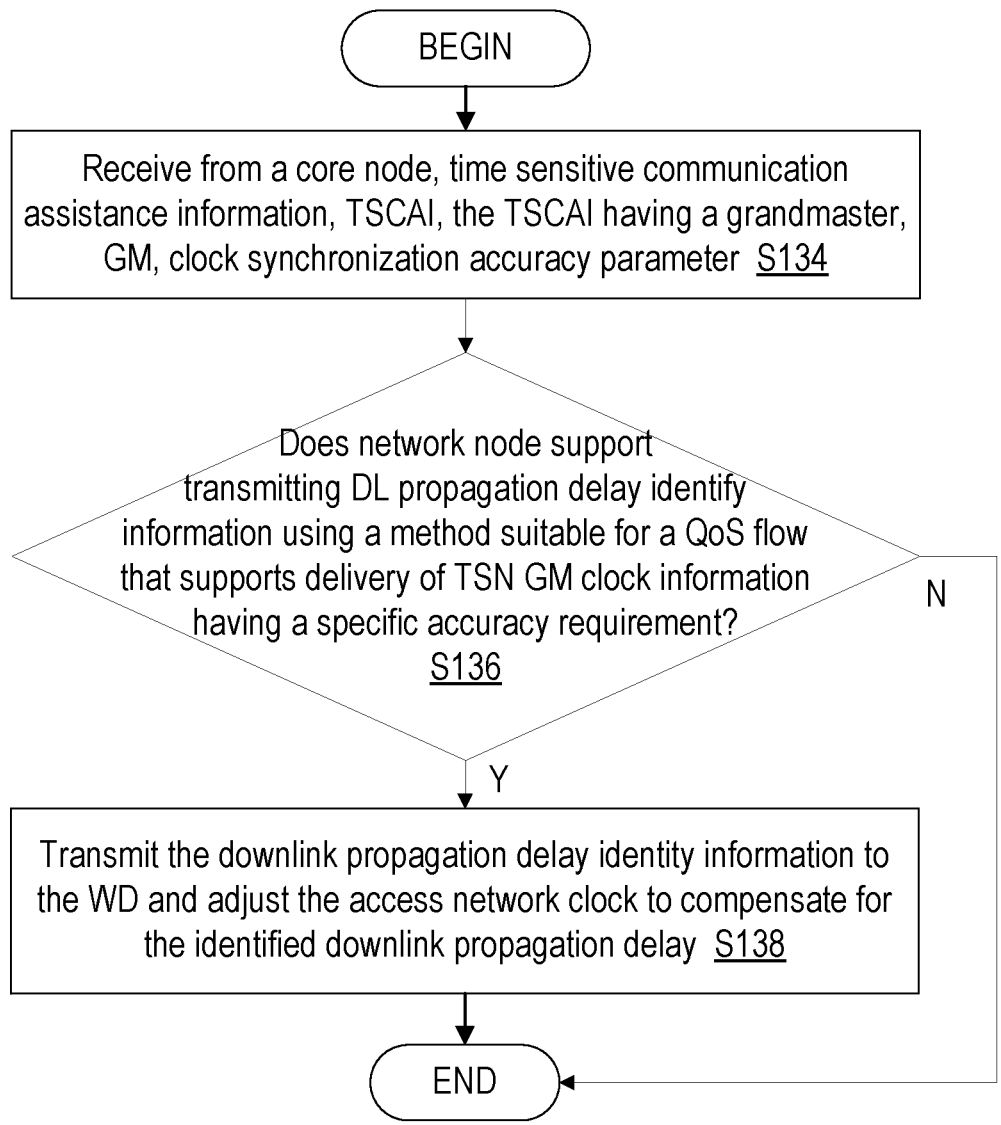
FIG. 8 is a flowchart of an example process in a network node according to some embodiments of the present disclosure.

FIG. 8 is a flowchart of an example process in a network node 16 for conditionally transmitting propagation delay identity information (also referred to as propagation delay information) suitable for a QoS flow that supports delivery of TSN GM clock information having a specific accuracy requirement. One or more blocks described herein may be performed by one or more elements of network node 16 such as by one or more of processing circuitry 68 (including the determiner unit 32), processor 70, radio interface 62 and/or communication interface 60. Network node 16 such as via processing circuitry 68 and/or processor 70 and/or radio interface 62 and/or communication interface 60 is configured to receive from a core network node 14, time sensitive communication assistance information, TSCAI, the TSCAI having a grandmaster, GM, clock synchronization accuracy parameter (Block S134). The process also includes determining, based on the accuracy parameter, when a network node 16 supports transmitting downlink propagation delay identity information using a method suitable for a quality of service, QoS, flow that supports delivery of time sensitive networking, TSN, GM clock information having a specific accuracy requirement (Block S136). When the Network node 16 supports transmitting the access network clock and downlink propagation delay identity information using methods suitable for the specific accuracy requirement of a QoS flow that supports delivery of the TSN GM clock information, the process includes transmitting the downlink propagation delay identity information to the WD and adjusting the access network clock to compensate for the identified downlink propagation delay (Block S138).

In other words, it is the 5GS clock (i.e., access network clock) at wireless device 22 that needs to be compensated for RF air propagation time between network node 16 and wireless device 22 since when distributed from network node 16, it is defined at the network node 16 antenna. The 5GS clock at wireless device 22 may be used to timestamp (ingress or egress) for residence time when TSN timing packets (i.e., TSN GM clock information) are transmitted through the access network.

Figure 9:
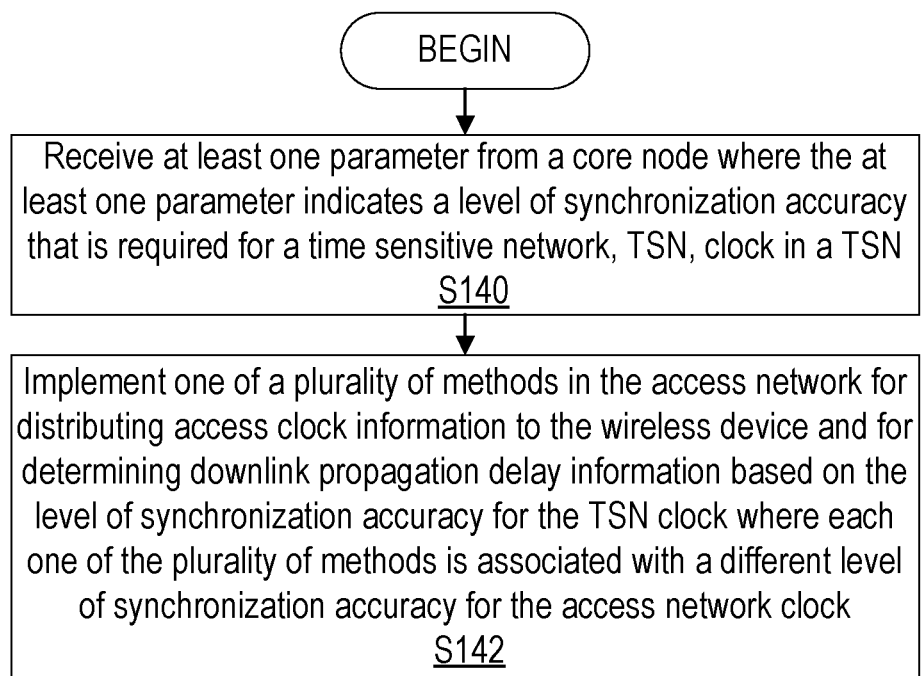
FIG. 9 is a flowchart of another example process in a network node according to some embodiments of the present disclosure.

FIG. 9 is a flowchart of another example process in a network node 16 according to some embodiments of the present disclosure. One or more blocks described herein may be performed by one or more elements of network node 16 such as by one or more of processing circuitry 68 (including the determiner unit 32), processor 70, radio interface 62 and/or communication interface 60. Network node 16 is configured to receive (Block S140) at least one parameter from a core network node 12 where the at least one parameter indicates a level of synchronization accuracy for an access network clock that is required by the wireless device 22 for a time sensitive network, TSN, clock in a TSN 23, as described herein. Network node 16 is configured to implement (Block S142) one of a plurality of methods in the access network 12 for distributing access network clock information and for determining downlink propagation delay information based on the level of synchronization accuracy required by the wireless device for the TSN clock where each one of the plurality of methods is associated with a different level of synchronization accuracy for the access network clock, as described herein.

According to one or more embodiments, the downlink propagation delay information is configured to allow for updating of an access network clock associated with the access network clock information where the updated access network clock is configured to allow for timestamping of TSN clock information for compensation of the TSN clock information. According to one or more embodiments, the at least one parameter is time sensitive communication assistance information, TSCAI where the TSCAI has a grandmaster, GM, clock synchronization accuracy parameter. According to one or more embodiments, the TSN clock information is relayed through the access network 12 using at least one QoS flow for communication to an end station in the TSN 23 via the wireless device 22.

According to one or more embodiments, the at least one QoS flow includes a first QoS flow and a second QoS flow, and where the TSN clock information is relayed through the access network 12 using the first QoS flow that is associated with a first protocol data unit, PDU, session from the wireless device 22 and the second QoS flow associated with a second PDU session from another wireless device 22 that is connected to an end station that requires the TSN clock. According to one or more embodiments, the at least one QoS flow is configured to indicate a plurality of levels of accuracy for the TSN clock. According to one or more embodiments, the TSN clock information is distributed in a user plane of the access network 12.

According to one or more embodiments, the level of synchronization accuracy for the access network clock corresponds to an amount of end-to-end synchronization accuracy required for the TSN clock. According to one or more embodiments, the plurality of methods includes at least one of: a first method that includes determining propagation delay in the access network using a legacy TA process, a second method that includes determining propagation delay in the access network 12 using a round trip time, RTT, process where the RTT process has a higher synchronization accuracy than the legacy TA process, and a third method that does not include determining propagation delay in the access network 12. The determined propagation delay is configured to be used for access network clock compensation. According to one or more embodiments, the plurality of methods includes at least one of: a first method configured to broadcast access network clock information to the wireless device 22 using system information block, SIB, broadcast; and a second method configured to use radio resource control, RRC, unicast to distribute access network clock information to the wireless device 22.

Figure 10:
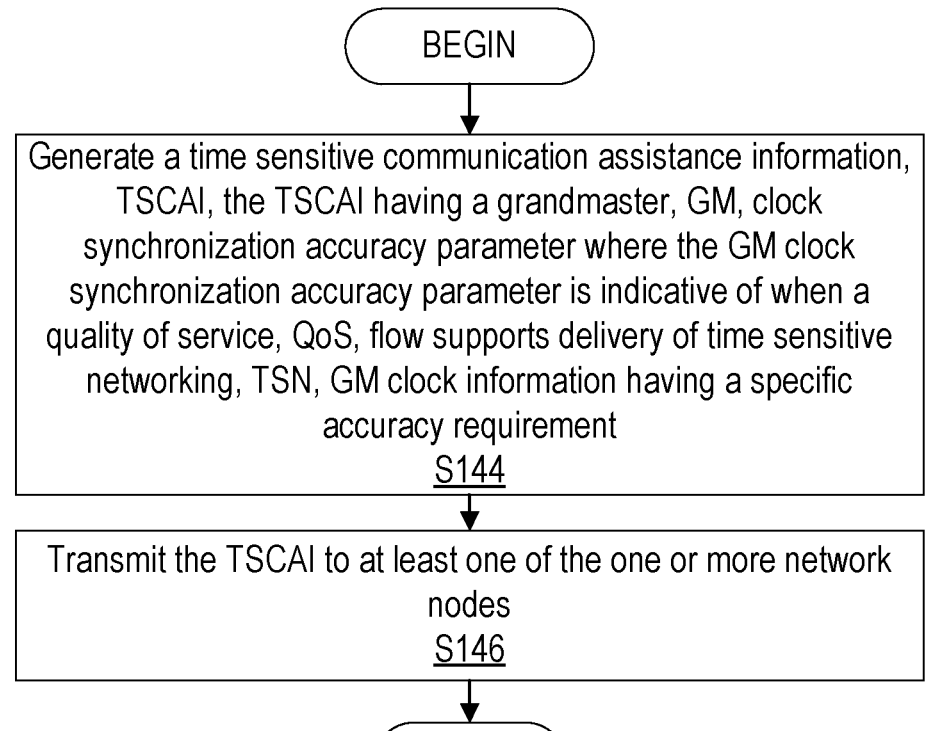
FIG. 10 is a flowchart of an example process in a core network node according to some embodiments of the present disclosure.

FIG. 10 is a flowchart of an example process in a core network node 14 according to some embodiments of the present disclosure for generating TSCAI having the GM clock synchronization accuracy parameter indicative of the allowable error when distributing/delivering the TSN GM clock to the TSN end station. One or more blocks described herein may be performed by one or more elements of core network node 12 such as by one or more of processing circuitry 96 (including the TSCAI generator 15), processor 100 and/or communication interface 94. Core network node 12 such as via processing circuitry 96 and/or processor 100 and/or communication interface 94 is configured to generate time sensitive communication assistance information, TSCAI, the TSCAI having a grandmaster, GM, clock synchronization accuracy parameter, the GM clock synchronization accuracy parameter being indicative of when a quality of service, QoS, flow supports delivery of time sensitive networking, TSN, GM clock information having a specific accuracy requirement (Block S144). The process also includes transmitting the TSCAI to at least one of the one or more network nodes 16 (Block S146).

Figure 11:
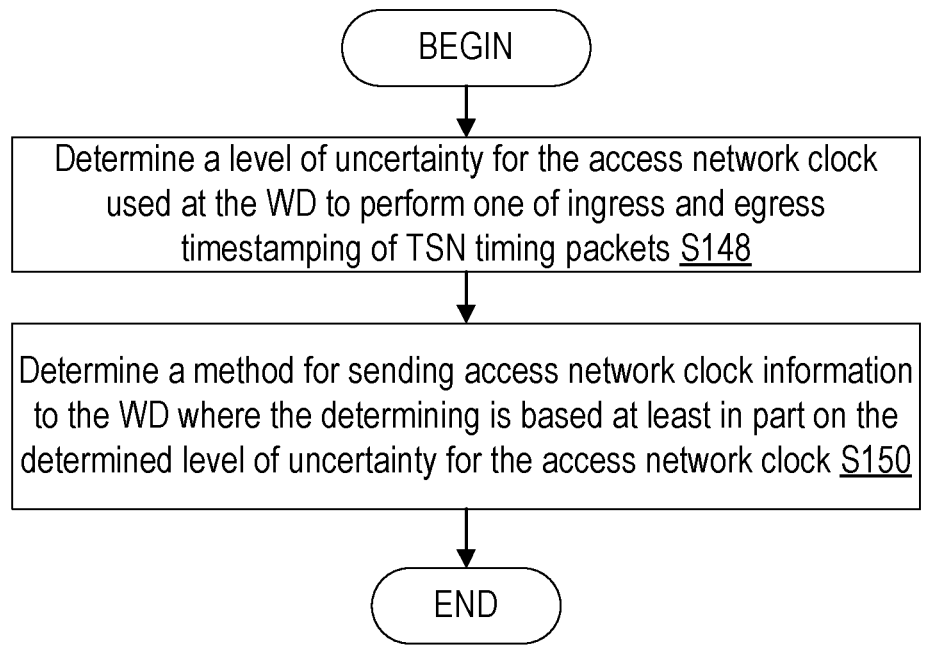
FIG. 11 is a flowchart in a network node according to principles set forth herein.

FIG. 11 is a flowchart of an example process in a network node 16 according to principles set forth herein. One or more blocks described herein may be performed by one or more elements of network node 16 such as by one or more of processing circuitry 68 (including the determiner unit 32), processor 70, radio interface 62 and/or communication interface 60. Network node 16 such as via processing circuitry 68 and/or processor 70 and/or radio interface 62 and/or communication interface 60 is configured to determine a level of uncertainty for the access network clock used at the WD 22 to perform one of ingress and egress timestamping of TSN timing packet (i.e., TSN clock information) (Block S148). The method also includes determining a method for sending access network clock information to the WD 22, the determining being based at least in part on the determined level of uncertainty for the access network clock (Block S150). In other words, it is delivery of a TSN GM clock within a certain accuracy which requires the WD 22 to have a certain accuracy of the access network clock. In one or more embodiments, the sending of access network clock information may include any one of broadcast and unicast for distribution of the information where the determined method may be associated with a specific process for determining propagation delay.

Figure 12:
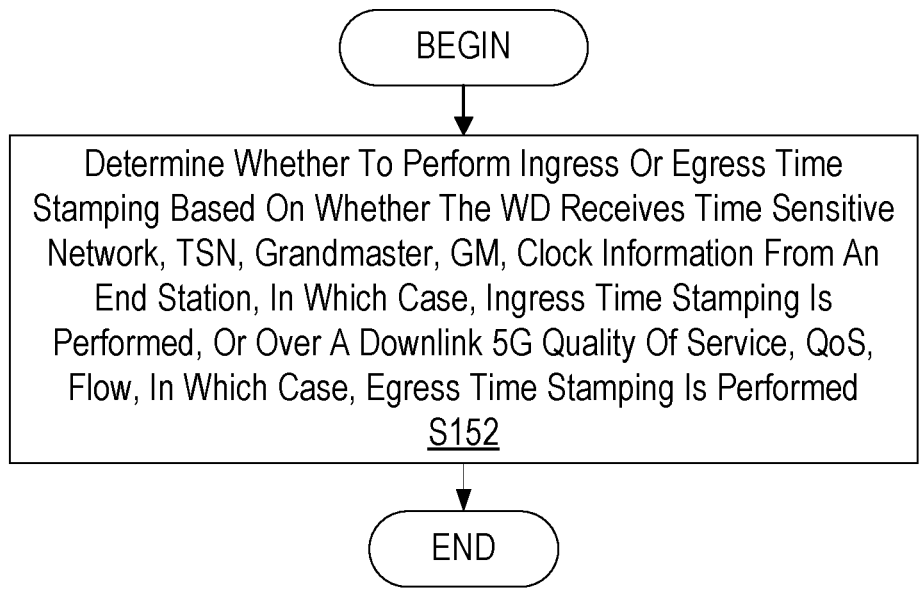
FIG. 12 is a flowchart in a wireless device according to principles set forth herein.

FIG. 12 is a flowchart of an example process in a wireless device 22 according to some embodiments of the present disclosure One or more blocks described herein may be performed by one or more elements of wireless device 22 such as by one or more of processing circuitry 84 (including the TSCAI generator 15), processor 86, radio interface 82 and/or communication interface 60. Wireless device 22 such as via processing circuitry 84 and/or processor 86 and/or radio interface 82 is configured to determine whether to perform ingress or egress time stamping based on whether the WD 22 receives time sensitive network, TSN, grandmaster, GM, clock information from an end station, in which case, ingress time stamping is performed, or over a downlink 5G quality of service, QoS, flow, in which case, egress time stamping is performed (Block S152).

Figure 13:
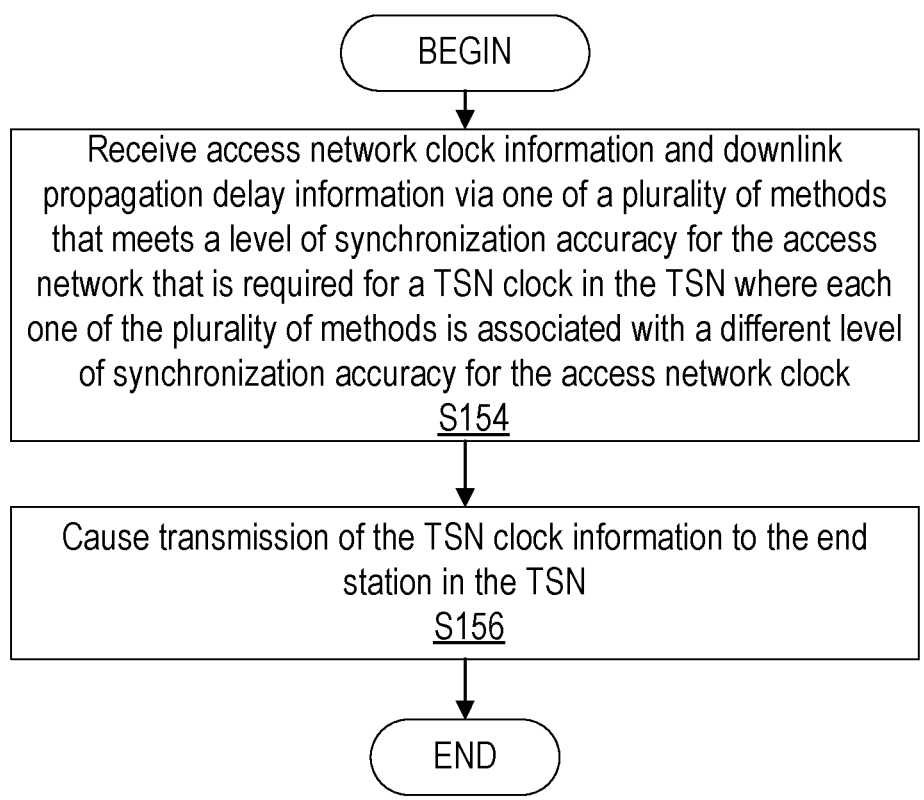
FIG. 13 is a flowchart of an example process in a wireless device according to the principles set forth herein.

FIG. 13 is a flowchart of another example process in a wireless device 22 according to some embodiments of the present disclosure One or more blocks described herein may be performed by one or more elements of wireless device 22 such as by one or more of processing circuitry 84 (including the TSCAI generator 15), processor 86, radio interface 82 and/or communication interface 60. Wireless device 22 is configured to receive (Block S154) access network clock information and downlink propagation delay information via one of a plurality of methods that meets a level of synchronization accuracy for the access network 12 that is required by the wireless device 22 for a TSN clock in the TSN 23 where each one of the plurality of methods being associated with a different level of synchronization accuracy for the access network clock, as described herein. Wireless device 22 is configured to cause (Block S156) transmission of the TSN clock information to the end station in the TSN 23, as described herein.

According to one or more embodiments, the processing circuitry 84 is configured to determine a propagation delay based at least on the downlink propagation delay, update the access network clock based on the determined propagation delay, perform egress timestamping on the TSN clock information that is received from the network node 16 where the egress timestamping is performed using the updated access network clock, determine an adjustment is required for the TSN clock information based at least on the egress timestamping, and compensate the TSN clock information based on the determined adjustment. According to one or more embodiments, the processing circuitry 84 is configured to: determine a propagation delay based at least on the downlink propagation delay, update the access network clock based on the determined propagation delay, and perform ingress timestamping on the TSN clock information that is received from an end station in the TSN where the ingress timestamping is performed using the updated access network clock and the ingress timestamping is configured to be used for adjusting the TSN clock information.

According to one or more embodiments, the TSN clock information is relayed through the access network 12 using the at least one QoS flow. According to one or more embodiments, the at least one QoS flow includes a first QoS flow and a second QoS flow. The TSN clock information is relayed through the access network 12 using the first QoS flow that is associated with a first protocol data unit, PDU, session from the wireless device 22 and the second QoS flow associated with a second PDU session from another wireless device 22 that is connected to an end station that requires the TSN clock. According to one or more embodiments, the at least one QoS flow is configured to indicate a plurality of levels of accuracy for a TSN clock.

According to one or more embodiments, the TSN clock information is received in a user plane of the access network 12. According to one or more embodiments, the level of synchronization accuracy for the access network clock corresponds to an amount of end-to-end synchronization accuracy required for the TSN clock. According to one or more embodiments, the plurality of methods includes at least one of: a first method that includes determining propagation delay in the access network 12 using a legacy TA process, a second method that includes determining propagation delay in the access network 12 using a round trip time, RTT, process where the RTT process has a higher synchronization accuracy than the legacy TA process, and a third method that does not include determining propagation delay in the access network 12. The determined propagation delay is configured to be used for access network clock compensation. According to one or more embodiments, the plurality of methods includes at least one of: a first method configured to broadcast access network clock information to the wireless device 22 using system information block, SIB, broadcast, and a second method configured to use radio resource control, RRC, unicast to distribute access network clock information to the wireless device 22.

Having described the general process flow of arrangements of the disclosure and having provided examples of hardware and software arrangements for implementing the processes and functions of the disclosure, the sections below provide details and examples of arrangements for support of a quality of service (QoS) flow specific uncertainty attribute.

One or more network node 16 functions described below may be performed by one or more of processing circuitry 68, processor 70, determiner unit 32, radio interface 62 (e.g., air interface), communication interface 60, etc. One or more wireless device 22 functions described below may be performed by one or more of processing circuitry 84, processor 86, radio interface 82, time stamp determiner 34, etc. One or more core network node 12 functions described below may be performed by one or more of processing circuitry 96, processor 100, TSCAI generator 15, communication interface 94, etc.

In one configuration, a TSN GM clock is located in an end station of a TSN where the TSN GM clock information may be relayed to one or more end stations that are connected to one or more WDs 22 in a 5G system using the user plane function (UPF)/network TSN translator (NW-TT).

In this case, a 5G QoS flow includes a data radio bearer (DRB) over the radio interface and a General Packet Radio Service (GPRS) Tunneling Protocol-User (GTP-U) tunnel over the network node 16 to user plane function (UPF)

interface. At least one specific 5G QoS flow will be configured to support the delivery of TSN GM clocks as user plane payload sent through the 5G system, in some embodiments.

Ingress timestamping is performed when a TSN GM clock is received by a 5G system (e.g., at the UPF/NW-TT) and egress timestamping is performed when that same TSN GM clock has been relayed (through the 5G system) to a WD 22.

In another configuration, a TSN GM clock is located in an end station that is connected to a WD 22 of a 5G system which means the TSN GM clock information is relayed to other end stations connected to one or more WDs 22 that are part of the same 5G system.

Figure 14:
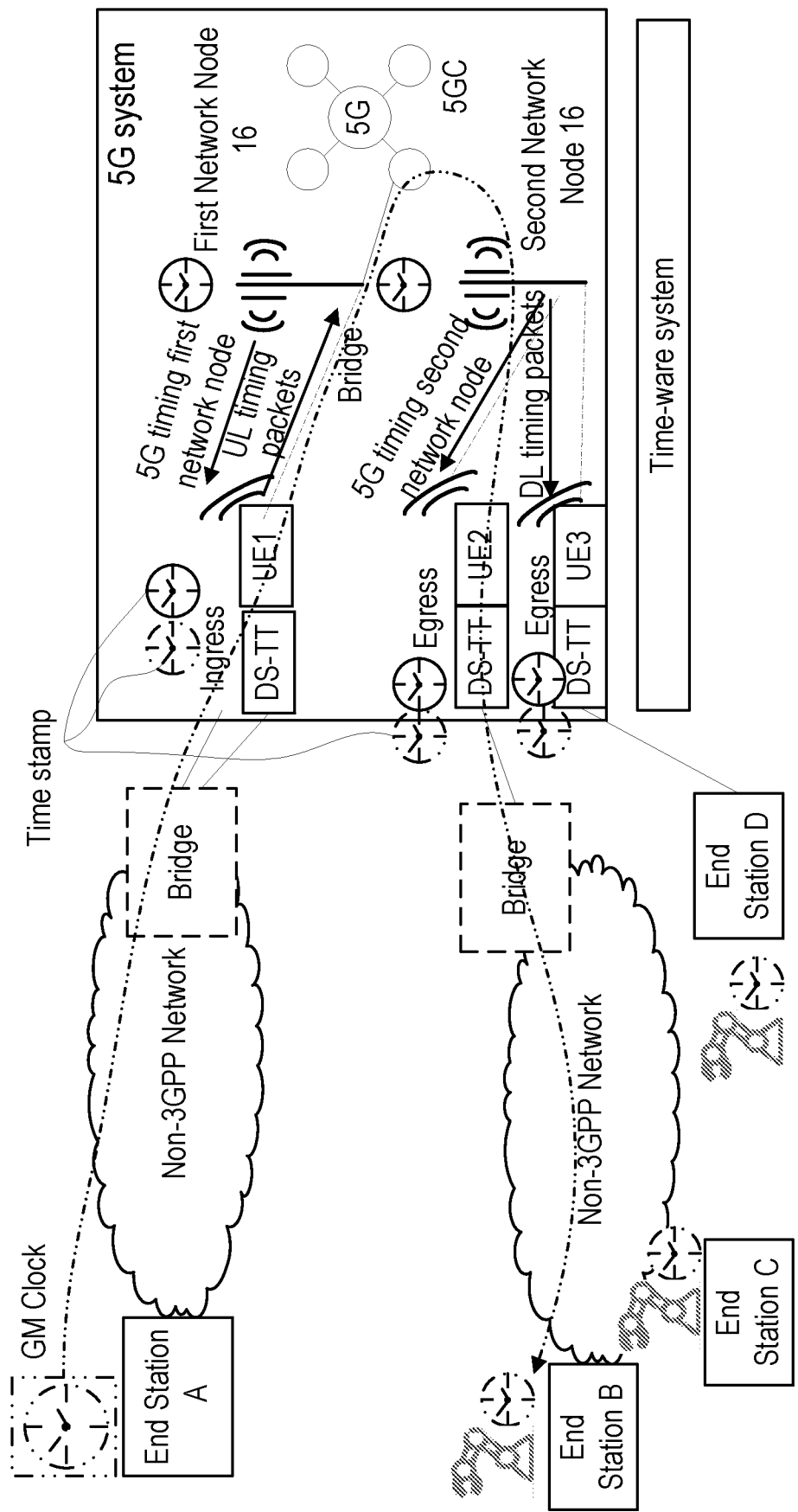
FIG. 14 is a diagram of an example of ingress and egress timestamping for TSN GM clock according to the principles set forth herein.

FIG. 14 is a diagram of diagram of ingress and egress timestamping for TSN GM clock.

In this case illustrated in FIG. 14, there are two 5G QoS flows used for TSN GM clock delivery through the 5G system where the first 5G QoS flow is realized using a PDU session from a first WD (connected to an end station where a TSN GM clock is located) to a user plane function (UPF) and the second 5G QoS flow is realized using a PDU session from a second WD (connected to an end station requiring that TSN GM clock) to a UPF.

As such, for this case, the total 5G system path over which a TSN GM clock is delivered may consist of two distinct PDU sessions with each comprising a data radio bearer (i.e., one per WD—gNB interface where one is an UL data radio bearer (DRB) and one is a DL DRB) and a GTP-U tunnel (i.e., one per gNB—UPF interface).

Two distinct GTP-U tunnels may be associated with this case regardless of whether the first WD and second WD are connected to the same network node as illustrated in FIG. 14 In one or more embodiments, two distinct network nodes are involved in the path used for TSN GM clock delivery (i.e., the inter-network node option). Note that the TSN GM clock delivery path could also involve a single network node (i.e., the intra-network node option); and/or Ingress timestamping is performed when an TSN GM clock is received by a 5G system (e.g., at the first WD 22/DS-TT) and egress timestamping is performed when that same TSN GM clock has been relayed (through the 5G system) to the second WD 22;

Regardless of the configuration, i.e., regardless of where the TSN GM clock is located, the amount of uncertainty introduced when a TSN GM clock is relayed through the 5G system will be impacted by the accuracy of the 5G system clock used for timestamping at the ingress and egress points.

When a TSN GM clock is needed by a set of end stations connected to one or more WDs 22 (reachable through a 5G system), then it may be assumed that there is a TSN network-based determination of the end-to-end synchronicity (uncertainty) requirement for that TSN GM clock (e.g., known at the centralized network controller (CNC)) and thereby, a related 5GS budget.

This end-to-end uncertainty requirement may be relayed to the 5G system and made available to the network node 16 so that the network node 16 can deliver the 5G system clock to ingress and egress points with a level of uncertainty that is suitable for supporting the end-to-end uncertainty requirement of the corresponding TSN GM clock.

For example, each TSN GM clock may also have an attribute (e.g., known at the CNC) indicating whether or not it is located at an end station reachable through a WD of a 5G system. This attribute can be taken into account when the end-to-end uncertainty requirement is relayed to the 5G system (i.e., the end-to-end uncertainty requirement identified by the TSN network and relayed to the 5G system will be more demanding if the TSN GM clock is located at an end station reachable through a WD).

If a TSN GM is located at an end station reachable through a WD of a 5G system, then that WD manages further distribution of the TSN GM clock in the uplink and therefore must receive a more accurate 5G system clock for performing ingress timestamping (of TSN GM clock information it receives from an end station).

Whether a WD uses the 5G system clock for ingress or egress timestamping is determined based on whether it receives TSN GM clock information over a downlink 5G QoS flow (in which case it performs egress timestamping) or from an end station for transmission over an uplink 5G QoS flow (in which case it performs ingress timestamping).

Method 1—New Time Sensitive Communication (TSC) Assistance Information

TSN GM clock information (treated as user plane traffic) intended for delivery to a WD 22 is expected to be received periodically by a 5G system and to have traffic characteristics that are known beforehand, thereby allowing a corresponding QoS flow to be established in support of that traffic. Time sensitive communication (TSC) assistance information (TSCAI), for example as defined in Table 5.27.2-1 of 3GPP Technical Standard (TS) 23.501, is provided from a service management function (SMF) to a network node 16 (e.g., upon QoS flow establishment). The TSCAI parameters may be set according to QoS flow specific traffic parameters obtained from the application function (AF). The TSCAI parameters therefore allow a network node 16 to schedule data radio bearer (DRB) resources appropriate for transmission of TSN GM clock information supported using a given QoS flow.

In some embodiments, this method calls for introducing a new "GM clock synchronization accuracy" parameter (optionally included) as part of the 5GS QoS flow specific information provided to the network node 16 as part of the TSCAI, thereby allowing a network node 16 to determine when a given QoS flow supports the delivery of TSN GM clock information having a specific synchronization accuracy (uncertainty) requirement. This then allows a network node 16 to determine which radio interface signaling method (e.g., legacy TA procedure) the network node 16 should use to provide the corresponding WD 22 with information that allows it to identify the downlink PD. This method is applicable regardless of where the TSN GM clock is located because the method assumes the source node providing TSCAI knows whether any given TSN GM clock supported using a given 5G QoS flow is located at an end station reachable through a WD 22 or not. In other words, if the end station is reachable through a WD 22, then this new parameter will indicate a more demanding value for the clock synchronization accuracy since two radio interfaces will be involved when delivering the TSN GM clock from the source end station to a target end station. This parameter therefore allows a network node 16 to determine an optimal method for distributing 5G system clock information over the air interface to the specific WD 22 for which such a 5G QoS flow is configured, (e.g., a PD determined using a round trip time (RTT) based method may be suitable for some TSN GM clock synchronization accuracy requirements).

Identifying downlink PD applicable to a WD with a suitable level of accuracy is useful since the 5G system clock sent to a WD 22 may need to be compensated to reflect the downlink PD to thereby improve the accuracy (reduce the uncertainty) with which the 5G residence time is measured. I.e., when sending a TSN GM clock to a WD 22 through the 5G system, the TSN GM clock should be adjusted to reflect 5G residence time measured using 5G system clock based timestamping. An example of possible values for this new TSCAI parameter are as follows:

- Clock Sync Accuracy 1: Radio interface uncertainty requirement is relaxed (e.g., ≥5 us) and therefore 5G information does not need to be compensated to reflect downlink PD, in which case a broadcast method to distribute the 5G system clock information may be sufficient;
- Clock Sync Accuracy 2: 500 ns≤radio interface uncertainty requirement<5 us and therefore a network node 16 can determine that either (a) no PD compensation is needed due to small cell radius (e.g., radius<30 m) or (b) pre-compensation can be used for a certain range of cell radius (e.g., 30 m≤radius≤300 m) or (c) legacy RTT method is suitable (e.g., cell radius>300 m). For (c), a broadcast method may also be sufficient to distribute 5G system clock information;
- Clock Sync Accuracy 3: 200 ns≤radio interface uncertainty requirement<500 ns and therefore a network node 16 can determine that either (a) no PD compensation is needed due to small cell radius (e.g., radius<30 m) or (b) pre-compensation can be used for a certain range of cell radius (e.g., 30 m≤radius≤60 m) or (c) enhanced RTT method needed (e.g., cell radius>60 m). For (c), an enhanced radio resource control (RRC) unicast based method could be used to distribute 5G system clock information; and
- Clock Sync Accuracy 4: Radio interface uncertainty requirement<200 ns and therefore a network node 16 can determine that either (a) no PD compensation is needed due to small cell radius (e.g., radius<30 m) or (b) pre-compensation can be used for a certain range of cell radius (e.g., 30 m≤radius≤60 m) or (c) advanced RTT method needed (e.g., cell radius>60 m). For (c) an advanced RRC unicast based method is likely needed to distribute a 5G system clock information.

Method 2—5G QoS Indicator (5QI) Table Entry Attribute

This method provides a new "uncertainty" parameter for the 5G QoS Indicator (5QI) table currently used for identifying QoS flow specific characteristics (see example Table 1 below). This parameter (optionally included) allows a network node 16 with access to 5G QoS Indicator (5QI) table parameters to determine when a given QoS flow supports the delivery of TSN GM clock information having a specific synchronization accuracy (uncertainty) requirement. With this information, a network node 16 can determine an optimal method for distributing 5G system clock information over the air interface to specific WDs (e.g., legacy TA procedure, broadcast or optimized RRC unicast procedure). The network node 16 may be used to provide a WD 22 configured to use such a QoS flow with information necessary for identifying the downlink PD applicable to that WD 22. Identifying downlink PD is useful since the 5G system clock sent to a WD 22 may need to be compensated to reflect the downlink PD to improve the accuracy (reduce uncertainty) with which the 5G residence time is measured. For example, when sending a TSN GM clock to a WD 22 through the 5G system, the TSN GM clock can be adjusted to reflect 5G residence time measured using 5G system clock based timestamping.

One option is to allow for a set of 5G QoS flows to be used to support the delivery of TSN GM clock information where each 5G QoS flow is associated with a different 5QI table entry/index. This means that TSN GM clocks having different uncertainty requirements can be considered as separate categories of TSN flows such that each category maps to a different QoS flow and therefore a different 5QI table index/entry. Conversely, all TSN GM clocks required by a given WD that have the same uncertainty requirement can be supported using a common 5G QoS flow (i.e., they can map to the same 5QI table entry/index—see Example 1 in Table 1 below); and A variation of this option is to allow for grouping TSN GM clocks according to the maximum uncertainty that can be tolerated by all TSN GM clocks in the group. This means that TSN GM clocks having different values for their maximum allowed uncertainty can be considered as separate categories of TSN flows such that each category maps to a different 5QI table index/entry (see Example 2 in Table 1 below).

TABLE 1

| 5G QoS characteristics |
| --- |
| Resource Type (GBR, Delay critical GBR or Non-GBR) |
| Priority Level |
| Packet Delay Budget (including Core Network Packet Delay Budget) |
| Packet Error Rate |
| Averaging window (for GBR and Delay-critical GBR resource type only) |
| Maximum Data Burst Volume (for Delay-critical GBR resource type only) |
| This new 5QI table attribute is only included for 5QI table entries associated with 5G QoS flows used to deliver TSN GM clocks (UL/DL/sidelink). Some classification examples for this new attribute are as follows: |
| Example 1: Fixed Range Uncertainty Values |
| Not Applicable: The radio interface uncertainty requirement is large (e.g. ≥5 us) and therefore 5G reference time does not need to be compensated to reflect downlink PD. |
| Basic: 500 ns ≤ radio interface uncertainty requirement <5 us and therefore a network node can determine that either (a) no PD compensation is needed due to small cell radius (e.g. radius < 30 m) or (b) pre-compensation can be used for a certain range of cell radius (e.g. 30 m ≤ radius ≤ 300 m) or (c) legacy RTT method is suitable (e.g. cell radius > 300 m) |
| Enhanced: 200 ns ≤ radio interface uncertainty requirement <500 ns and therefore a network node can determine that either (a) no PD compensation is needed due to small cell radius (e.g. radius < 30 m) or (b) pre-compensation can be used for a certain range of cell radius (e.g. 30 m ≤ radius ≤ 60 m) or (c) enhanced RTT method needed (e.g. cell radius > 60 m) |
| Advanced: radio interface uncertainty requirement <200 ns and therefore a network node can determine that either (a) no PD compensation is needed due to small cell radius (e.g. radius < 30 m) or (b) pre-compensation can be used for a certain range of cell radius (e.g. 30 m ≤ radius ≤ 60 m) or (c) advanced RTT method needed (e.g. cell radius > 60 m) |
| Example 2: Threshold Based Uncertainty Levels |
| Level 0: Not Applicable |
| Level 1: TSN GM clock uncertainty requirement < X1 ns; |
| Level 2: TSN GM clock uncertainty requirement < X2 ns, where X2 < X1; |
| . . . |
| Level n: TSN GM clock uncertainty requirement < X ns, where Xn < Xn − 1 and n is any natural number and Xn is a non-negative real number |
| Note: This new parameter can be for either an UL or DL or sidelink data radio bearer. |

Method 3—Multiple GTP-U Tunnels

This method introduces a new "uncertainty" attribute associated with each GTP-U tunnel used within the context of a single packet data unit (PDU) session (i.e., a PDU session is configured to include multiple GPRS tunneling protocol-user (GTP-U) tunnels). This allows a network node 16 configured with multiple GTP-U tunnels within the context of a PDU session to use this new attribute to determine the most suitable radio interface signaling method (e.g., legacy TA procedure) the network node 16 should use to provide the corresponding WD 22 with downlink PD information used to adjust a 5G system clock. that allows the WD 22 to identify the downlink PD. This method is applicable to cases where TSN GM clock information is sent to an end station, reachable through a given WD 22, using a set of GTP-U tunnels. Each GTP-U tunnel in the set has a corresponding "uncertainty" requirement for the TSN GM clock information the GTP-U tunnel carries. All GTP-U tunnels may be supported using a common DRB to that WD over the radio interface. In other words, the network node 16 knows over which GTP-U tunnel it has received TSN GM clock information and therefore knows the corresponding "uncertainty" requirement so that it can thereby determine a suitable method for delivering 5G system clock information to that WD 22.

Identifying downlink PD may be useful since the 5G system clock sent to a WD 22 may need to be compensated to reflect the downlink PD to improve the accuracy (uncertainty) with which the 5G residence time is measured (i.e., when sending a TSN GM clock to a WD 22 through the 5G system, the TSN GM clock that is distributed through the 5G system needs to be adjusted to reflect 5G residence time measured using 5G system clock (i.e., updated 5G system clock) based timestamping (i.e., using the ingress and egress timestamping)).

Figure 15:
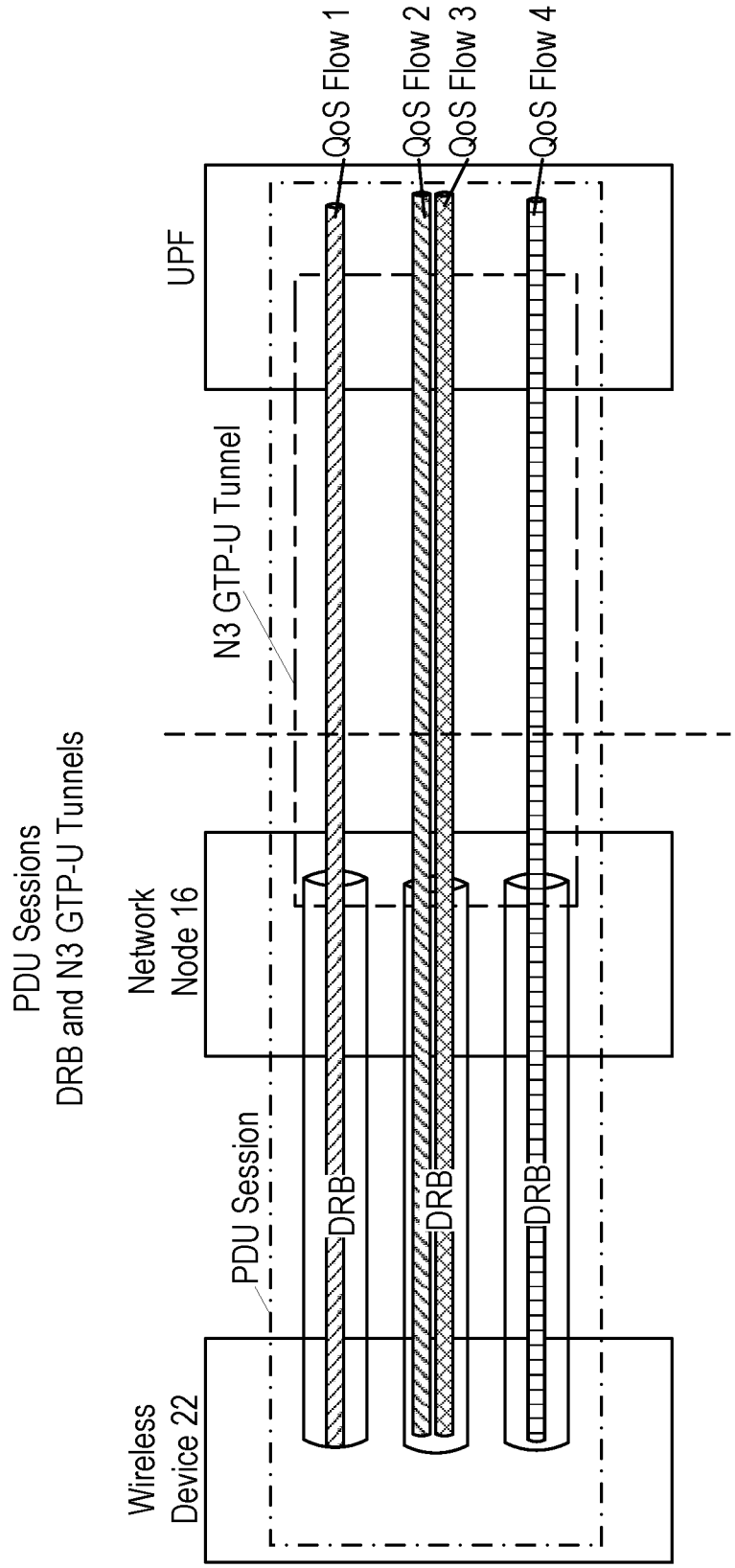
FIG. 15 is a diagram of 5G QoS flows within a packet data unit (PDU) session.

FIG. 15 shows an example of the current case where a PDU session is configured to make use of a single GTP-U tunnel while still allowing for multiple 5G QoS flows;

However, for this method, a set of multiple distinct GTP-U tunnels may be used exclusively for sending TSN GM clock information. Each GTP-U tunnel in the set may be used within the context of a single PDU session wherein the same or different DRBs can be used for each member of the set of GTP-U tunnels;

The new "uncertainty" attribute can be implicitly indicated based on the tunnel endpoint identifier (TEID) value (i.e., different TEIDs can be reserved for indicating different uncertainty requirements). All TSN GM clocks having the same uncertainty requirement can therefore be supported using a common GTP-U tunnel.

For example, 4 distinct TEID values can be allocated in support of delivering TSN GM clock information as follows:

i) TEID1: Radio interface uncertainty requirement is large (e.g., ≥5 us) and therefore 5G reference time does not need to be compensated to reflect downlink PD;

ii) TEID2: 500 ns≤radio interface uncertainty requirement<5 us and therefore a network node 16 can determine that either (a) no PD compensation is needed due to small cell radius (e.g., radius<30 m) or (b) pre-compensation can be used for a certain range of cell radius (e.g., 30 m≤radius≤300 m) or (c) legacy RTT method is suitable (e.g., cell radius>300 m);

iii) TEID3: 200 ns≤radio interface uncertainty requirement<500 ns and therefore a network node 16 can determine that either (a) no PD compensation is needed due to small cell radius (e.g., radius<30 m) or (b) pre-compensation can be used for a certain range of cell radius (e.g. 30 m≤radius≤60 m) or (c) enhanced RTT method needed (e.g., cell radius>60 m); and iv) TEID4: Radio interface uncertainty requirement<200 ns and therefore a network node 16 can determine that either (a) no PD compensation is needed due to small cell radius (e.g., radius<30 m) or (b) pre-compensation can be used for a certain range of cell radius (e.g. 30 m≤radius≤60 m) or (c) advanced RTT method needed (e.g., cell radius>60 m).

According to one aspect, a network node 16 configured to communicate with a wireless device, WD 22 is provided. The network node 16 includes a radio interface 62 and/or processing circuitry 68 configured to receive from a core node, time sensitive communication assistance information, TSCAI, the TSCAI having a grandmaster, GM, clock synchronization accuracy parameter, determine, based at least in part on the accuracy parameter, when a quality of service, QoS, flow supports delivery of time sensitive networking, TSN, GM clock information having a specific accuracy requirement, and, when the QoS flow supports delivery of the TSN GM clock information having the specific accuracy requirement, transmit identity information to the WD 22 that enables the WD 22 to identify a downlink propagation delay between the network node 16 and the WD 22 and to adjust the 5GS clock (i.e., update the access network clock) for RF propagation delay between network node 16 and wireless device 22.

According to this aspect, in some embodiments, the GM clock synchronization is based at least in part on a radio interface uncertainty requirement. In some embodiments, the network node 16 and/or processing circuitry 68 are further configured to determine one of that no propagation delay is needed due to a cell size, that pre-compensation of the transmitted identity information can be used for a certain range of cell sizes, and that a round trip time method can be used for cell sizes above a threshold. In some embodiments, the network node 16 and/or radio interface 62 and or processing circuitry 68 are further configured to associate an uncertainty attribute with each of a plurality of GTP-U tunnels, the uncertainty attribute used by the network node 16 to determine which of a plurality of radio interface signaling methods to use to transmit the identity information.

According to another aspect, a method implemented in a network node 16 includes receiving via the communication interface 60 or via the interface to a core network node 14, time sensitive communication assistance information, TSCAI, the TSCAI having a grandmaster, GM, clock synchronization accuracy parameter. The method also includes determining via the processing circuitry 68, based at least in part on the accuracy parameter, when a quality of service, QoS, flow supports delivery of time sensitive networking, TSN, GM clock information having a specific accuracy requirement. When the network node 16 supports transmitting downlink propagation delay identity information using a method suitable for a QoS flow that supports delivery of the TSN GM clock information having the specific accuracy requirement, the method further includes transmitting via the radio interface 62 identity information to the WD 22 that enables the WD 22 to identify a downlink propagation delay between the network node 16 and the WD 22 and to adjust the access network clock to compensate for the downlink propagation delay. In one or more embodiments, the network node 16 may determine which PD method to implement.

According to this aspect, in some embodiments, the GM clock synchronization is based at least in part on a radio interface uncertainty requirement. In some embodiments, the method further includes determining via the processing circuitry 68 one of that no downlink propagation delay is needed due to a cell size, that pre-compensation of the transmitted identity information can be used for a certain range of cell sizes, and that a round trip time, RTT, method can be used for cell sizes above a threshold. In some embodiments, the method further includes associating via the processing circuitry 68 an uncertainty attribute with each of a plurality of GTP-U tunnels, the uncertainty attribute used by the network node 16 to determine which of a plurality of radio interface signaling methods to use to transmit the identity information.

According to another aspect, a core network node 14 configured to communicate with one or more network nodes 16 that are in communication with one or more WDs 22 is provided. The core network node 14 includes a communication interface 94 and/or processing circuitry 96 configured to generate time sensitive communication assistance information, TSCAI, the TSCAI having a grandmaster, GM, clock synchronization accuracy parameter, the GM clock synchronization accuracy parameter being indicative of when a quality of service, QoS, flow supports delivery of time sensitive networking, TSN, GM clock information having a specific accuracy requirement. The communication interface is further configured to transmit via the communication interface 94 the TSCAI to at least one of the one or more network nodes 16.

According to yet another aspect, a method implemented in a core network node 14 in communication with one or more network nodes 16 includes generating via the TSCAI generator 15 the TSCAI, the TSCAI having a grandmaster, GM, clock synchronization accuracy parameter, the GM clock synchronization accuracy parameter being indicative of when a quality of service, QoS, flow supports delivery of time sensitive networking, TSN, GM clock information having a specific accuracy requirement. The method also includes transmitting via the communication interface 94 the TSCAI to at least one of the one or more network nodes 16.

According to one aspect, a network node 16 configured to communicate with a wireless device, WD 22, is configured to, and/or comprises a radio interface 62 and/or processing circuitry 68 configured to: determine a level of accuracy for the WD 22 to support a time sensitive network, TSN, grandmaster, GM, clock, and determine a method for sending system clock information to the WD 22, the determining being based at least in part on the determined level of accuracy.

According to this aspect, in some embodiments, the network node 16/radio interface 62/processing circuitry 68 are further configured to send the system clock information via two flows, a first of the two flows being realized using a first packet data unit, PDU, session from a first WD 22 and the second of the two flows being realized using a second PDU session from a second WD 22. In some embodiments, each of the first and second PDU sessions include data radio bearers. In some embodiments, first and second GTP-U tunnels are associated with the first and second PDU sessions, respectively.

According to another aspect, a method implemented in a network node 16 includes determining a level of accuracy for the WD 22 to support a time sensitive network, TSN, grandmaster, GM, clock, and determining a method for sending system clock information to the WD 22, the determining being based at least in part on the determined level of accuracy.

According to this aspect, in some embodiments, the network node 16/radio interface/processing circuitry are further configured to send the system clock information via two flows, a first of the two flows being realized using a first packet data unit, PDU, session from a first WD 22 and the second of the two flows being realized using a second PDU session from a second WD 22. In some embodiments, each of the first and second PDU sessions include data radio bearers. In some embodiments, first and second GTP-U tunnels are associated with the first and second PDU sessions, respectively.

According to yet another aspect, a WD 22 configured to communicate with a network node 16, is configured to, and/or includes a radio interface 82 and/or processing circuitry 84 configured to: determine whether to perform ingress or egress time stamping based on whether the WD 22 receives time sensitive network, TSN, grandmaster, GM, clock information from an end station, in which case, ingress time stamping is performed, or over a downlink 5G quality of service, QoS, flow, in which case, egress time stamping is performed.

According to this aspect, the WD 22/radio interface 82/processing circuitry 84 is further configured to receive TSN GM clock information over at least one GTP-U tunnel, each of the at least one GTP-U tunnel having a corresponding uncertainty requirement for the TSN GM clock information carried by the at least one GTP-U.

According to another aspect, a method implemented in a WD 22 in communication with a network node 16 includes determining whether to perform ingress or egress time stamping based on whether the WD 22 receives time sensitive network, TSN, grandmaster, GM, clock information from an end station, in which case, ingress time stamping is performed, or over a downlink 5G quality of service, QoS, flow, in which case, egress time stamping is performed.

According to this aspect, in some embodiments, the method further includes receiving TSN GM clock information over at least one GTP-U tunnel, each of the at least one GTP-U tunnel having a corresponding uncertainty requirement for the TSN GM clock information carried by the at least one GTP-U, the uncertainty requirement to be used by the network node 16 to select a method for delivering 5G system clock information to the WD 22.

SOME EXAMPLES

Example A1

A network node (16) configured to communicate with a wireless device (22), WD (22), the network node (16) configured to, and/or comprising a radio interface (62) and/or comprising processing circuitry (68) configured to:
 determine a level of accuracy for the WD (22) to support a time sensitive network, TSN (23), grandmaster, GM, clock; and
 determine a method for sending system clock information to the WD (22), the determining being based at least in part on the determined level of accuracy.

Example A2

The network node (16) of Example A1, wherein the network node (16)/radio interface (62)/processing circuitry (68) are further configured to send the system clock information via two flows, a first of the two flows being realized using a first packet data unit, PDU, session from a first WD (22), and the second of the two flows being realized using a second PDU session from a second WD (22).

Example A3

The network node (16) of Example A2, wherein each of the first and second PDU sessions include data radio bearers.

Example A4

The network node (16) of Example A3, wherein first and second GTP-U tunnels are associated with the first and second PDU sessions, respectively.

Example B1

A method implemented in a network node (16), the method comprising:
  determining a level of accuracy for the WD (22) to support a time sensitive network, TSN, grandmaster, GM, clock; and
  determining a method for sending system clock information to the WD (22), the determining being based at least in part on the determined level of accuracy.

Example B2

The method of Example B1, wherein the network node (16)/radio interface (62)/processing circuitry (68) are further configured to send the system clock information via two flows, a first of the two flows being realized using a first packet data unit, PDU, session from a first WD (22), and the second of the two flows being realized using a second PDU session from a second WD (22).

Example B3

The method of Example B2, wherein each of the first and second PDU sessions include data radio bearers.

Example B4

The method of Example B3, wherein first and second GTP-U tunnels are associated with the first and second PDU sessions, respectively.

Example C1

A wireless device, WD (22), configured to communicate with a network node (16), the WD (22) configured to, and/or comprising a radio interface (82) and/or comprising processing circuitry (84) configured to:
  determine whether to perform ingress or egress time stamping based on whether the WD (22) receives time sensitive network, TSN, grandmaster, GM, clock information from an end station, in which case, ingress time stamping is performed, or over a downlink 5G quality of service, QoS, flow, in which case, egress time stamping is performed.

Example C2

The WD (22) of Example C1, wherein the WD (22)/radio interface (82)/processing circuitry (84) is further configured to receive TSN GM clock information over at least one GTP-U tunnel, each of the at least one GTP-U tunnel having a corresponding uncertainty requirement for the TSN GM clock information carried by the at least one GTP-U.

Example D1

A method implemented in a WD (22) in communication with a network node (16), the method comprising:
  determining whether to perform ingress or egress time stamping based on whether the WD (22) receives time sensitive network, TSN, grandmaster, GM, clock information from an end station, in which case, ingress time stamping is performed, or over a downlink 5G quality of service, QoS, flow, in which case, egress time stamping is performed.

Example D2

The method of Example D1, further comprising receiving TSN GM clock information over at least one GTP-U tunnel, each of the at least one GTP-U tunnel having a corresponding uncertainty requirement for the TSN GM clock information carried by the at least one GTP-U, the uncertainty requirement to be used by the network node (16) to select a method for delivering 5G system clock information to the WD (22).

Embodiment AA1

A network node (16) configured to communicate with a wireless device, WD (22), the network node (16) configured to, and/or comprising a radio interface (62) and/or comprising processing circuitry (68) configured to:
  receive from a core network node (14), time sensitive communication assistance information, TSCAI, the TSCAI having a grandmaster, GM, clock synchronization accuracy parameter;
  determine, based at least in part on the accuracy parameter, when a quality of service, QoS, flow supports delivery of time sensitive networking, TSN, GM clock information having a specific accuracy requirement; and
  when the QoS flow supports delivery of the TSN GM clock information having the specific accuracy requirement and the network node 16 supports delivery of downlink propagation delay identity information using a method suitable for the specific accuracy requirement, transmit identity information to the WD (22) that enables the WD (22) to identify a downlink propagation delay between the network node (16) and the WD (22) and to adjust the access network clock to compensate for the identified downlink propagation delay.

Embodiment AA2

The network node (16) of Embodiment AA1, wherein the network node (16) and/or radio interface (62) and/or processing circuitry (68) are further configured to determine one of that no propagation delay is needed due to a cell size, that pre-compensation of the transmitted identity information can be used for a certain range of cell sizes, and that a round trip time method can be used for cell sizes above a threshold.

Embodiment AA3

The network node (16) of any of Embodiments AA1-AA2, wherein the network node (16) and/or radio interface

(62) and/or processing circuitry (68) are further configured to associate an uncertainty attribute with each of a plurality of GTP-U tunnels, the uncertainty attribute used by the network node (16) to determine which of a plurality of radio interface signaling methods to use to transmit the identity information.

Embodiment BB1

A method implemented in a network node (16), the method comprising:
  receiving from a core network node (14), time sensitive communication assistance information, TSCAI, the TSCAI having a grandmaster, GM, clock synchronization accuracy parameter;
  determining, based at least in part on the accuracy parameter, when a quality of service, QoS, flow supports delivery of time sensitive networking, TSN, GM clock information having a specific accuracy requirement;
  when the QoS flow supports delivery of the TSN GM clock information having the specific accuracy requirement and the network node 16 supports delivery of downlink propagation delay identity information using a method suitable for the specific accuracy requirement, transmitting identity information to the WD (22) that enables the WD (22) to identify a downlink propagation delay between the network node (16) and the WD (22) and to adjust the access network clock to compensate for the identified downlink propagation delay.

Embodiment BB2

The method of Embodiment BB1, further comprising determining one of that no downlink propagation delay is needed due to a cell size, that pre-compensation of the transmitted identity information can be used for a certain range of cell sizes, and that a round trip time, RTT, method can be used for cell sizes above a threshold.

Embodiment BB3

The method of any of Embodiments BB1-BB2, further comprising associating an uncertainty attribute with each of a plurality of GTP-U tunnels, the uncertainty attribute used by the network node (16) to determine which of a plurality of radio interface signaling methods to use to transmit the identity information.

Embodiment CC1

A core network node (14) configured to communicate with one or more network nodes (16) that are in communication with one or more wireless devices (22), WDs, the core network node (14) configured to, and/or comprising a communication interface (94) and/or comprising processing circuitry (96) configured to:
  generate time sensitive communication assistance information, TSCAI, the TSCAI having a grandmaster, GM, clock synchronization accuracy parameter, the GM clock synchronization accuracy parameter being indicative of when a quality of service, QoS, flow supports delivery of time sensitive networking, TSN, GM clock information having a specific accuracy requirement; and
  transmit the TSCAI to at least one of the one or more network nodes (16).

Embodiment DD1

A method implemented in a core network node (14) in communication with one or more network nodes (16), the method comprising
  generating time sensitive communication assistance information, TSCAI, the TSCAI having a grandmaster, GM, clock synchronization accuracy parameter, the GM clock synchronization accuracy parameter being indicative of when a quality of service, QoS, flow supports delivery of time sensitive networking, TSN, GM clock information having a specific accuracy requirement; and
  transmitting the TSCAI to at least one of the one or more network nodes (16).

Therefore, in one or more embodiments, the 5GS clock/access network clock is used to perform time stamping of TSN timing packets at ingress and egress for TSN Timing packet 5GS residence time compensation between ingress and egress. The delivery of the 5GS clock to WD 22 can take RF propagation delay into account to allow WD 22 have a more accurate copy of 5GS time, thereby improving end to end TSN Timing accuracy delivery.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | 3$^{rd}$ Generation Partnership Project |
| 5G | 5$^{th}$ Generation |
| 5QI | 5G QoS Indicator |
| CE | Control Element |
| CN | Core Network |
| CNC | Centralized Network Controller |
| DRB | Data Radio Bearer |
| DS-TT | Device Side TSN Translator |
| D2D | Device-To-Device |
| DL | Downlink |
| GM | Grandmaster |
| GPRS | General Packet Radio Service |
| gNB | Next Generation NodeB |
| gPTP | General Precision Time Protocol |

-continued

| Abbreviation | Explanation |
| --- | --- |
| GTP-U | GPRS Tunneling Protocol-User |
| LTE | Long-Term Evolution |
| MAC | Media Access Control |
| NR | New Radio |
| NW-TT | Network TSN Translator |
| OTA | Over-The-Air |
| PD | Propagation Delay |
| ppb | Parts Per Billion |
| PTP | Precision Time Protocol |
| RAR | Radio Access Response |
| RRC | Radio Resource Control |
| RTT | Round Trip Time |
| SFN | Super-Frame Number |
| SIB | System Information Block |
| SMF | Session Management Function |
| TEID | Tunnel End Point Identifier |
| TSCAI | Time Sensitive Communications Assistance Information |
| TSN AF | Time Sensitive Networking Application Function |
| TA | Timing Advance |
| TS | Time Synchronization |
| TTI | Transmission Time Interval |
| UE | User Equipment |
| UL | Uplink |
| UPF | User Plane Function |
| URLLC | Ultra-Reliable and Low-Latency Communications |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device via an access network, the network node comprising:
processing circuitry configured to:
receive at least one parameter from a core network node, the at least one parameter indicating a level of synchronization accuracy that is required for a time sensitive network, TSN, clock in a TSN; and
implement one of a plurality of methods in the access network for distributing access network clock information to the wireless device and for determining downlink propagation delay information based on the level of synchronization accuracy for the TSN clock, each one of the plurality of methods being associated with a different level of synchronization accuracy for an access network clock, the TSN clock being based on the access network clock.

2. The network node of claim 1, wherein the downlink propagation delay information is configured to allow for updating of the access network clock associated with the access network clock information, the updated access network clock configured to allow for timestamping of TSN clock information for compensation of the TSN clock information.

3. The network node of claim 1, wherein TSN clock information is relayed through the access network using a first QoS flow that is associated with a first protocol data unit, PDU, session from the wireless device and a second QoS flow associated with a second PDU session from another wireless device that is connected to an end station that requires the TSN clock.

4. The network node of claim 1, wherein the plurality of methods includes at least one of:
- a first method that includes determining downlink propagation delay in the access network using a legacy TA process, the determined downlink propagation delay configured to be used for access network clock compensation;
- a second method that includes determining downlink propagation delay in the access network using a round trip time, RTT, process, the RTT process having a higher synchronization accuracy than the legacy TA process, the determined downlink propagation delay configured to be used for access network clock compensation; and
- a third method that does not include determining downlink propagation delay in the access network.

5. The network node of claim 1, wherein the plurality of methods includes at least one of:
- a first method configured to broadcast the access network clock information to the wireless device using system information block, SIB, broadcast; and
- a second method configured to use radio resource control, RRC, unicast to distribute the access network clock information to the wireless device.

6. A wireless device configured to communicate with a network node via an access network and with an end station in a time sensitive network, TSN, that is separate from the access network, the wireless device comprising:
- processing circuitry configured to:
  - receive access network clock information and downlink propagation delay information via one of a plurality of methods that meets a level of synchronization accuracy for the access network that is required for a TSN clock in the TSN, each one of the plurality of methods being associated with a different level of synchronization accuracy for an access network clock; and
  - cause transmission of TSN clock information to the end station in the TSN, the TSN clock information being based on the access network clock information.

7. A method implemented by a network node that is configured to communicate with a wireless device via an access network, the method comprising:
- receiving at least one parameter from a core network node, the at least one parameter indicating a level of synchronization accuracy that is required for a time sensitive network, TSN, clock in a TSN; and
- implementing one of a plurality of methods in the access network for distributing access network clock information to the wireless device and for determining downlink propagation delay information based on the level of synchronization accuracy for the TSN clock, each one of the plurality of methods being associated with a different level of synchronization accuracy for an access network clock, the TSN clock being based on the access network clock.

8. The method of claim 7, wherein the downlink propagation delay information is configured to allow for updating of the access network clock associated with the access network clock information, the updated access network clock configured to allow for timestamping of TSN clock information for compensation of the TSN clock information.

9. The method of claim 7, wherein the at least one parameter is time sensitive communication assistance information, TSCAI, the TSCAI having a grandmaster, GM, clock synchronization accuracy parameter.

10. The method of claim 7, wherein TSN clock information is relayed through the access network using at least one QoS flow for communication to an end station in the TSN via the wireless device.

11. The method of claim 10, wherein the at least one QoS flow includes a first QoS flow and a second QoS flow; and
- the TSN clock information being relayed through the access network using the first QoS flow that is associated with a first protocol data unit, PDU, session from the wireless device and the second QoS flow associated with a second PDU session from another wireless device that is connected to the end station that requires the TSN clock.

12. The method of claim 10, wherein the at least one QoS flow is configured to indicate a plurality of levels of accuracy for the TSN clock.

13. The method of claim 7, wherein TSN clock information is distributed in a user plane of the access network.

14. The method of claim 7, wherein the level of synchronization accuracy for the access network clock corresponds to an amount of end-to-end synchronization accuracy required for the TSN clock.

15. The method of claim 7, wherein the plurality of methods includes at least one of:
- a first method that includes determining downlink propagation delay in the access network using a legacy TA process, the determined downlink propagation delay is configured to be used for access network clock compensation;
- a second method that includes determining downlink propagation delay in the access network using a round trip time, RTT, process, the RTT process having a higher synchronization accuracy than the legacy TA process, the determined downlink propagation delay is configured to be used for access network clock compensation; and
- a third method that does not include determining downlink propagation delay in the access network.

16. The method of claim 7, wherein the plurality of methods includes at least one of:
- a first method configured to broadcast the access network clock information to the wireless device using system information block, SIB, broadcast; and
- a second method configured to use radio resource control, RRC, unicast to distribute the access network clock information to the wireless device.

17. A method implemented by a wireless device that is configured to communicate with a network node via an access network and with an end station in a time sensitive network, TSN, that is separate from the access network, the method comprising:
- receiving access network clock information and downlink propagation delay information via one of a plurality of methods that meets a level of synchronization accuracy for the access network that is required for a TSN clock in the TSN, each one of the plurality of methods being associated with a different level of synchronization accuracy for an access network clock; and
- causing transmission of TSN clock information to the end station in the TSN, the TSN clock information being based on the access network clock information.

18. The method of claim 17, further comprising:
- determining a propagation delay based at least on a downlink propagation delay;
- updating the access network clock based on the determined propagation delay;

perform egress timestamping on the TSN clock information that is received from the network node, the egress timestamping being performed using the updated access network clock;

determining an adjustment is required for the TSN clock information based at least on the egress timestamping; and compensating the TSN clock information based on the determined adjustment.

19. The method of claim 17, further comprising:

determining a propagation delay based at least on a downlink propagation delay;

updating the access network clock based on the determined propagation delay; and performing ingress timestamping on the TSN clock information that is received from the end station in the TSN, the ingress timestamping being performed using the updated access network clock, the ingress timestamping being configured to be used for adjusting the TSN clock information.

20. The method of claim 17, wherein TSN clock information is relayed through the access network using at least one QoS flow.

21. The method of claim 20, wherein the at least one QoS flow includes a first QoS flow and a second QoS flow; and the TSN clock information being relayed through the access network using the first QoS flow that is associated with a first protocol data unit, PDU, session from the wireless device and the second QoS flow associated with a second PDU session from another wireless device that is connected to the end station that requires the TSN clock.

22. The method of claim 20, wherein the at least one QoS flow is configured to indicate a plurality of levels of accuracy for a TSN clock.

23. The method of claim 17, wherein TSN clock information is received in a user plane of the access network.

24. The method of claim 17, wherein the level of synchronization accuracy for the access network clock corresponds to an amount of end-to-end synchronization accuracy required for the TSN clock.

25. The method of claim 17, wherein the plurality of methods includes at least one of:

a first method that includes determining downlink propagation delay in the access network using a legacy TA process, the determined downlink propagation delay configured to be used for access network clock compensation;

a second method that includes determining downlink propagation delay in the access network using a round trip time, RTT, process, the RTT process having a higher synchronization accuracy than the legacy TA process, the determined downlink propagation delay configured to be used for access network clock compensation; and a third method that does not include determining downlink propagation delay in the access network.

26. The method of claim 17, wherein the plurality of methods includes at least one of:

a first method configured to broadcast the access network clock information to the wireless device using system information block, SIB, broadcast; and a second method configured to use radio resource control, RRC, unicast to distribute the access network clock information to the wireless device.

* * * * *